US010943421B2

(12) United States Patent
Okada et al.

(10) Patent No.: US 10,943,421 B2
(45) Date of Patent: Mar. 9, 2021

(54) IDENTIFICATION DEVICE, IDENTIFICATION METHOD, IDENTIFICATION PROGRAM, AND COMPUTER-READABLE MEDIUM INCLUDING IDENTIFICATION PROGRAM

(71) Applicant: TOPPAN PRINTING CO., LTD., Tokyo (JP)

(72) Inventors: Takashi Okada, Tokyo (JP); Tomohito Masuda, Tokyo (JP); Eri Miyamoto, Tokyo (JP); Kota Aono, Tokyo (JP); Shogo Fujita, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/127,796

(22) Filed: Sep. 11, 2018

(65) Prior Publication Data

US 2019/0012867 A1 Jan. 10, 2019

Related U.S. Application Data

(63) Continuation of application No. PCT/JP2017/009947, filed on Mar. 13, 2017.

(30) Foreign Application Priority Data

Mar. 16, 2016 (JP) ............................ JP2016-052703

(51) Int. Cl.
*G07D 7/128* (2016.01)
*G06K 9/20* (2006.01)
(Continued)

(52) U.S. Cl.
CPC ............ *G07D 7/128* (2013.01); *B42D 25/30* (2014.10); *B42D 25/328* (2014.10);
(Continued)

(58) Field of Classification Search
CPC ...... G07D 7/005; G07D 7/1205; G07D 7/128; G07D 7/206; G07D 7/205; G06K 9/2018;
(Continued)

(56) References Cited

U.S. PATENT DOCUMENTS

| | | | | |
|---|---|---|---|---|
| 7,652,757 B2 * | 1/2010 | Power | G07D 7/0032 356/71 |
| 2014/0037196 A1 * | 2/2014 | Blair | G07D 7/205 382/159 |
| 2016/0225215 A1 * | 8/2016 | Yamaguchi | G07D 7/121 |

FOREIGN PATENT DOCUMENTS

| | | |
|---|---|---|
| JP | 3865763 B2 | 10/2006 |
| JP | 2011-131527 A | 7/2011 |

(Continued)

OTHER PUBLICATIONS

International Search Report regarding International Application No. PCT/JP2017/009947, dated Apr. 18, 2017, 2 pps.

(Continued)

*Primary Examiner* — Hina F Ayub
(74) *Attorney, Agent, or Firm* — Foley & Lardner LLP

(57) ABSTRACT

An identification device of the present invention determines authenticity of an article with an anti-counterfeiting medium varying in a pattern of observed light depending on changes in light characteristics of radiated light, using the anti-counterfeiting medium. The identification device includes a similarity calculation unit that determines the degrees of similarity between a plurality of captured image data of the anti-counterfeiting medium obtained with differences in the light characteristics of the radiated light and reference image data corresponding to the light characteristics; and an authenticity determination unit that determines whether the degrees of similarity determined for the individual light characteristics exceed thresholds set corresponding to the individual light characteristics to make an authenticity deter- (Continued)

mination on whether the anti-counterfeiting medium is genuine.

9 Claims, 12 Drawing Sheets

(51) Int. Cl.

| | |
|---|---|
| ***G07D 7/005*** | (2016.01) |
| ***B42D 25/30*** | (2014.01) |
| ***B42D 25/328*** | (2014.01) |
| ***G07D 7/206*** | (2016.01) |
| ***G07D 7/1205*** | (2016.01) |

(52) U.S. Cl.
CPC ......... *G06K 9/2018* (2013.01); *G06K 9/2027* (2013.01); *G06K 9/2036* (2013.01); *G07D 7/005* (2017.05); *G07D 7/1205* (2017.05); *G07D 7/206* (2017.05)

(58) Field of Classification Search
CPC .... G06K 9/2027; G06K 9/2036; B42D 25/30; B42D 25/328
See application file for complete search history.

(56) References Cited

FOREIGN PATENT DOCUMENTS

| | | | |
|---|---|---|---|
| JP | 2012-037328 | A | 2/2012 |
| JP | 2014-166695 | A | 9/2014 |
| WO | WO-2015/045186 | A | 4/2015 |

OTHER PUBLICATIONS

Extended European Search Report dated Oct. 22, 2019 for corresponding Application No. 17766608.8 (8 pages).

* cited by examiner

FIG.2

| CAPTURED IMAGE DATA IDENTIFICATION INFORMATION | IMAGING ANGLE | IMAGING COORDINATE VALUE | RADIANCE | CAPTURED IMAGE DATA ADDRESS |
|---|---|---|---|---|
| ***** | ***** | ***** | ***** | ****** |
| ***** | ***** | ***** | ***** | ***** |
| ***** | ***** | ***** | ***** | ****** |
| ........ | ........ | ........ | ........ | ........ |

FIG.9

| DETERMINATION IMAGE DATA IDENTIFICATION INFORMATION | CAPTURED IMAGE DATA IDENTIFICATION INFORMATION | REFERENCE IMAGE DATA ADDRESS | DEGREE OF SIMILARITY |
|---|---|---|---|
| ＊＊＊＊＊ | ＊＊＊＊＊ | ＊＊＊＊＊ | ＊＊＊＊＊ |
| ＊＊＊＊＊ | ＊＊＊＊＊ | ＊＊＊＊＊ | ＊＊＊＊＊ |
| ＊＊＊＊＊ | ＊＊＊＊＊ | ＊＊＊＊＊ | ＊＊＊＊＊ |
| ⋮ | ⋮ | ⋮ | ⋮ |

IDENTIFICATION DEVICE, IDENTIFICATION METHOD, IDENTIFICATION PROGRAM, AND COMPUTER-READABLE MEDIUM INCLUDING IDENTIFICATION PROGRAM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/009947, filed on Mar. 13, 2017, which is based upon and claims the benefit of priority to Japanese Patent Application No. 2016-052703, filed on Mar. 16, 2016. The disclosures of which are all hereby incorporated herein by reference in their entireties.

TECHNICAL FIELD

The present invention relates to an identification device, an identification method, an identification program, and a computer-readable medium including the identification program that are usable for an authenticity determination against counterfeiting of negotiable securities such as merchandise certificates, credit cards, brand-name items, and mechanical components.

BACKGROUND ART

Conventionally, anti-counterfeiting media have been used for negotiable securities such as bank bills, stock certificates, merchandise certificates, and credit cards, and products such as medicines, food, and luxury brand-name items, to prevent illegal use of counterfeited or copied products. Such anti-counterfeiting media are directly printed on or transferred to the negotiable securities. Seals or tags with the anti-counterfeiting media are added to the products.

In recent years, however, illegal negotiable securities and products have been manufactured with counterfeited or copied anti-counterfeiting media, which makes it difficult to differentiate genuine articles and illicit articles (counterfeited or copied articles) only by the presence or absence of anti-counterfeiting media.

As an example of the foregoing anti-counterfeiting media, there are known diffraction gratings and holograms that vary in color and pattern depending on the angle of observation of the anti-counterfeiting media. In addition, as another example of anti-counterfeiting media, there are optically variable device (OVD) inks and pearl pigments that change in color and brightness.

Whether an anti-counterfeiting medium is real or false can be easily determined by comparison between a real anti-counterfeiting medium and a false anti-counterfeiting medium or by experts' visual inspection, but it is hard for general users to easily make a visual authenticity determination of an anti-counterfeiting medium.

For the cases where it is not possible to make a visual authenticity determination on an anti-counterfeiting medium, there is used a special authenticity determination device capable of controlling strictly the angle of observation of an anti-counterfeiting medium by an imaging device (refer to, for example, PTL 1).

CITATION LIST

[Patent Literature] [PTL 1] JP 3865763 B2

SUMMARY OF THE INVENTION

Technical Problem

When an anti-counterfeiting medium is imaged at a predetermined observation angle, a preset pattern of light emitted by the anti-counterfeiting medium is captured to obtain image data. However, an anti-counterfeiting medium may be counterfeited and printed to obtain captured image data similar to the real image data.

The authenticity determination device captures an image of an anti-counterfeiting medium at a predetermined observation angle, and thus may wrongly recognize the captured image data of the light pattern of the thus counterfeited anti-counterfeiting medium as the captured image data of the light pattern of the real anti-counterfeiting medium. In that case, the authenticity determination device cannot determine counterfeited or copied negotiable securities and products as illicit articles using the anti-counterfeiting media.

The present invention is devised in light of the foregoing circumstances and provides an identification device that can determine as false an anti-counterfeiting medium counterfeited by printing or the like from which a captured image of a light pattern similar to a light pattern of a real anti-counterfeiting medium is obtained at a predetermined angle, an identification method, an identification program, and a computer-readable medium including the identification program.

Intended Solution to Problem

To attempt to solve the foregoing problem, an identification device according to a first aspect of the present invention determines authenticity of an article with an anti-counterfeiting medium varying in a pattern of observed light depending on changes in light characteristics of radiated light, using the anti-counterfeiting medium. The identification device includes a similarity calculation unit that determines degrees of similarity between a plurality of captured image data of the anti-counterfeiting medium obtained with differences in the light characteristics of the radiated light and reference image data corresponding to the light characteristics; and an authenticity determination unit that determines whether the degrees of similarity determined for the individual light characteristics exceed thresholds set corresponding to the individual light characteristics to make an authenticity determination on whether the anti-counterfeiting medium is genuine.

The identification device according to the first aspect of the present invention may further include a light source that irradiates the anti-counterfeiting medium with light to generate a light pattern as a standard for authenticity determination during image capture; a light characteristics control unit that changes the light characteristics of the light with which the light source irradiates the anti-counterfeiting medium; and an imaging control unit that generates captured image data of the light pattern generated by the anti-counterfeiting medium for the individual light characteristics.

In the identification device according to the first aspect of the present invention, if all the degrees of similarity for the individual light characteristics fall under the thresholds corresponding to respective radiances, the authenticity determination unit may determine that the anti-counterfeiting medium is genuine.

The identification device according to the first aspect of the present invention may further include a reference image generation unit that generates the reference image data for comparison with the captured image data of the anti-counterfeiting medium, the reference image data corresponding to a predetermined imaging viewpoint and the light characteristics.

In the identification device according to the first aspect of the present invention, the light characteristics may include the radiance, wavelength, and polarization of light.

An identification method according to a second aspect of the present invention is an identification method for determining authenticity of an article with an anti-counterfeiting medium varying in a pattern of observed light depending on changes in light characteristics of radiated light, using the anti-counterfeiting medium. The identification method includes determining, by a similarity calculation unit, degrees of similarity between a plurality of captured image data of the anti-counterfeiting medium obtained with differences in the light characteristics of the radiated light and reference image data corresponding to the light characteristics; and determining, by an authenticity determination unit, whether the degrees of similarity determined for the individual light characteristics exceed thresholds set corresponding to the individual light characteristics to make an authenticity determination on whether the anti-counterfeiting medium is genuine.

An identification program according to a third aspect of the present invention is an identification program for causing a computer to execute steps of an identification method for determining authenticity of an article with an anti-counterfeiting medium varying in a pattern of observed light depending on changes in light characteristics of radiated light, using the anti-counterfeiting medium. The program causes the computer to execute the identification method including determining the degrees of similarity between a plurality of captured image data of the anti-counterfeiting medium obtained with differences in the light characteristics of the radiated light and reference image data corresponding to the light characteristics; and determining whether the degrees of similarity determined for the individual light characteristics exceed thresholds set corresponding to the individual light characteristics to make an authenticity determination on whether the anti-counterfeiting medium is genuine.

A computer-readable medium including an identification program according to a fourth aspect of the present invention includes an identification program for causing a computer to execute an identification process for determining authenticity of an article with an anti-counterfeiting medium varying in a pattern of observed light depending on changes in light characteristics of radiated light, using the anti-counterfeiting medium. The program causes the computer to execute the identification method including determining the degrees of similarity between a plurality of captured image data of the anti-counterfeiting medium obtained with differences in the light characteristics of the radiated light and reference image data corresponding to the light characteristics; and determining whether the degrees of similarity determined for the individual light characteristics exceed thresholds set corresponding to the individual light characteristics to make an authenticity determination on whether the anti-counterfeiting medium is genuine.

Desired Advantageous Effects of the Invention

As described above, the aspects of the present invention provide an identification device that determines as false a counterfeited anti-counterfeiting media formed by printing or the like from which a captured image of a light pattern similar to a light pattern of a real anti-counterfeiting medium is obtained at a predetermined angle, an identification method, an identification program, and a computer-readable medium including the identification program.

BRIEF DESCRIPTION OF THE DRAWINGS

FIG. 2 illustrates a configuration example of a captured image data table in an image data storage unit 112.

FIG. 9 illustrates a configuration example of an authenticity determination captured image data table in the image data storage unit 112.

DESCRIPTION OF REPRESENTATIVE EMBODIMENTS

Figure 1:
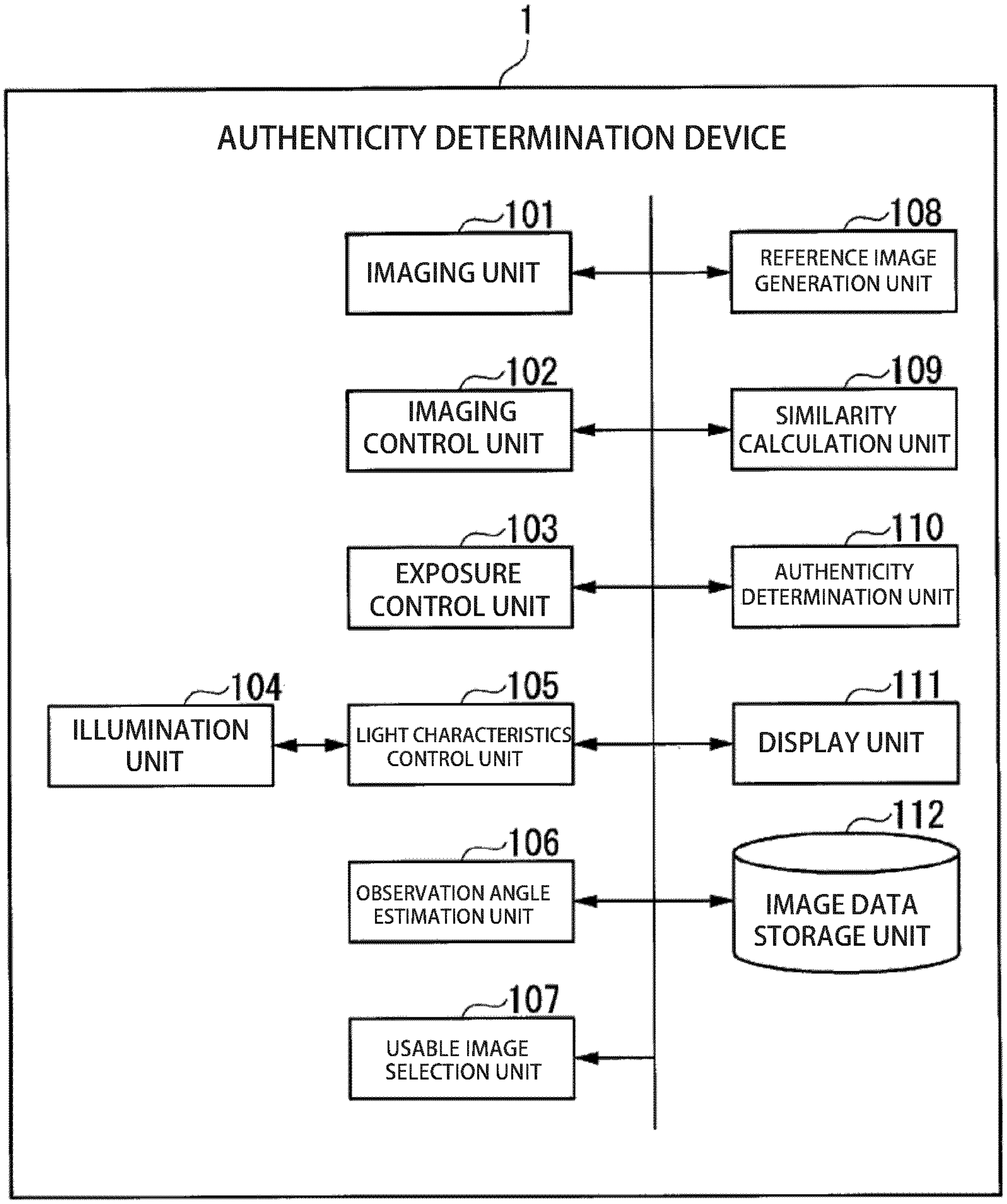
FIG. 1 is a block diagram illustrating a configuration example of an identification device according to a first embodiment.

With reference to the drawings, preferred or representative embodiments of the present invention will be described in detail. It is to be understood that the present invention is not limited to the following embodiments, which are intended to be representative of the present invention. The representative embodiments described below are merely examples of the present invention, and the design thereof could be appropriately changed by one skilled in the art. In the drawings and embodiment descriptions, the same or corresponding components are denoted by the same reference characters, and duplicate description thereof will be omitted.

First Embodiment

An identification device according to a first embodiment of the present invention will be described below with reference to the drawings.

FIG. 1 is a block diagram illustrating a configuration example of an identification device (authenticity determination device) according to a first embodiment. Referring to FIG. 1, an authenticity determination device 1 includes an imaging unit 101, an imaging control unit 102, an exposure control unit 103, an illumination unit 104, a light characteristics control unit 105, an observation angle estimation unit 106, a usable image selection unit 107, a reference image generation unit 108, a similarity calculation unit 109, an authenticity determination unit 110, a display unit 111, and an image data storage unit 112. In the identification device of the first embodiment, the imaging unit 101 and the illumination unit 104 are integrated to correspond to an authenticity determination process on a retroreflective anti-counterfeiting medium.

The imaging unit 101 is a camera or the like using an image sensor such as a charge coupled device (CCD) or a complementary metal oxide semiconductor (CMOS), for example. When the imaging control unit 102 described later supplies a control signal to the imaging unit 101, the imaging unit 101 writes and stores a captured image of a target object as captured image data in the image data storage unit 112 via the imaging control unit 102 described later.

When the imaging unit 101 obtains captured image data as an image of a pattern of light (an image of light color (wavelength), characters, or pictures) emitted from the anti-counterfeiting medium in response to the incident light, the imaging control unit 102 controls the conditions for imaging by the imaging unit 101 such as focal depth and the sensitivity of the imaging element (International Organization for Standardization (ISO) sensitivity). In addition, at the time of obtaining the captured image data for use in authenticity determination, the imaging control unit 102 outputs a control signal for the timing for imaging a preset number of times (corresponding to the number of kinds of radiance values described later) to the imaging unit 101, the exposure control unit 103, and the light characteristics control unit 105.

The exposure control unit 103 controls the conditions for imaging by the imaging unit 101 such as shutter speed and aperture value as exposure conditions. The exposure control unit 103 also outputs a light-emission instruction for causing the illumination unit 104 to emit imaging light (illumination light) as necessary at the time of imaging corresponding to the brightness of surroundings of the anti-counterfeiting medium to be imaged by the authenticity determination device 1.

The illumination unit 104 may be not only a general illuminator continuously irradiating an imaging target with light but also a light-emitting device called a flash or a strobe (registered trademark) irradiating an imaging target with light in a short time. The illumination unit 104 irradiates a target to be imaged with light of predetermined intensity in response to the light-emission instruction from the light characteristics control unit 105 described later. In this embodiment, the illumination unit 104 is described as a flash light source.

The light characteristics control unit 105 outputs a light-emission instruction for causing the illumination unit 104 to emit illumination light for irradiation of the anti-counterfeiting medium as described above, in correspondence with the control signal indicating the imaging timing supplied from the imaging control unit 102.

With each input of a control signal during imaging, the light characteristics control unit 105 outputs to the illumination unit 104 a control signal that causes the illumination unit 104 to emit light of different characteristics (the characteristics of light). In this embodiment, the characteristics of the emitted light are described as radiances of the emitted light. With each input of a control signal, the light characteristics control unit 105 controls the illumination unit 104 to emit light with different radiances. The levels of different radiances need to be set such that adjacent radiances are separated from each other to the degree that, when reference images are generated by simulation described later using the radiances as parameters, the generated reference images corresponding to the radiances are not determined as identical. Accordingly, the result of the authenticity determination using the reference image data with the preset plurality of radiances and the captured image data obtained with the corresponding radiances becomes more reliable and even highly reliable.

The observation angle estimation unit 106 determines an imaging viewpoint as information that includes an imaging coordinate value indicating the position of the anti-counterfeiting medium imaged to obtain the captured image data in a three-dimensional space and the angle of imaging by the imaging unit 101, from a coordinate conversion equation (described later). Specifically, the observation angle estimation unit 106 determines the imaging angle of the anti-counterfeiting medium in each of the captured image data, from the determined coordinate position of the anti-counterfeiting medium, and the imaging coordinate value and imaging direction of the imaging unit 101. In this instance, the observation angle estimation unit 106 acquires from the light characteristics control unit 105 the value of light characteristics (in this embodiment, the radiance value of the emitted light) with which each of the captured image data was obtained. The observation angle estimation unit 106 then writes and stores in the captured image data table in the image data storage unit 112, captured image data information including the imaging viewpoint formed from the determined imaging coordinate value and imaging angle together with captured image data identification information given to the captured image data for identifying each of the captured image data. In response to the incident light, the anti-counterfeiting medium emits a pattern of light observed to vary depending on the imaging angle (observation angle).

In this embodiment, the imaging unit 101 obtains at a predetermined focal length a plurality of captured image data of the anti-counterfeiting medium with different light characteristics of emitted light during imaging as described above. In this embodiment, to obtain a plurality of captured image data, it is necessary to use different radiances as the characteristics of the illumination light at the time of obtaining each of the captured image data. The observation angle estimation unit 106 estimates the respective imaging viewpoint (imaging coordinate value and imaging angle) of the captured image data of the anti-counterfeiting medium in a three-dimensional space, from the one or more captured image data using the preset coordinate conversion equation as described above.

The coordinate conversion equation is generated to, when a three-dimensional space is reproduced in advance from a plurality of captured image data (captured image data of a calibration board described later) as pre-processing prior to an authenticity determination process on the anti-counterfeiting medium as an authenticity determination target (preparation for the authenticity determination process), associate the coordinate positions of pixels in two-dimensional coordinates of the plurality of captured image data with the coordinate positions of the pixels in the three-dimensional space. The pre-generated coordinate conversion equation is written and stored in advance in the image data storage unit 112 for an authenticity determination target or for each of authenticity determination targets.

FIG. 2 illustrates a configuration example of a captured image data table in the image data storage unit 112. The captured image data table of FIG. 2 writes and stores the captured image data identification information, and the imaging angles, imaging coordinate values, radiance values, and captured image data addresses of the captured image data in correspondence with the captured image data identification information. The captured image data identification information here is information for identifying each of the captured image data.

The imaging angle refers to an angle formed by the imaging direction of the imaging unit 101 at the time of obtaining captured image data and the normal to the surface of the anti-counterfeiting medium when the authenticity determination target is arranged with any of vertexes or coordinate points of the authenticity determination target as an origin point in a coordinate system of a three-dimensional space (hereinafter "three-dimensional coordinate system"). The imaging coordinate value indicates the coordinate position where the imaging unit 101 captured an image of the authenticity determination target in the three-dimensional space. The radiance indicates the radiance value of the light emitted by the illumination unit 104. The captured image data address indicates the address of an area in the image data storage unit 112 where each of the captured image data is stored, which constitutes an index for reading the captured image data.

Figure 3:
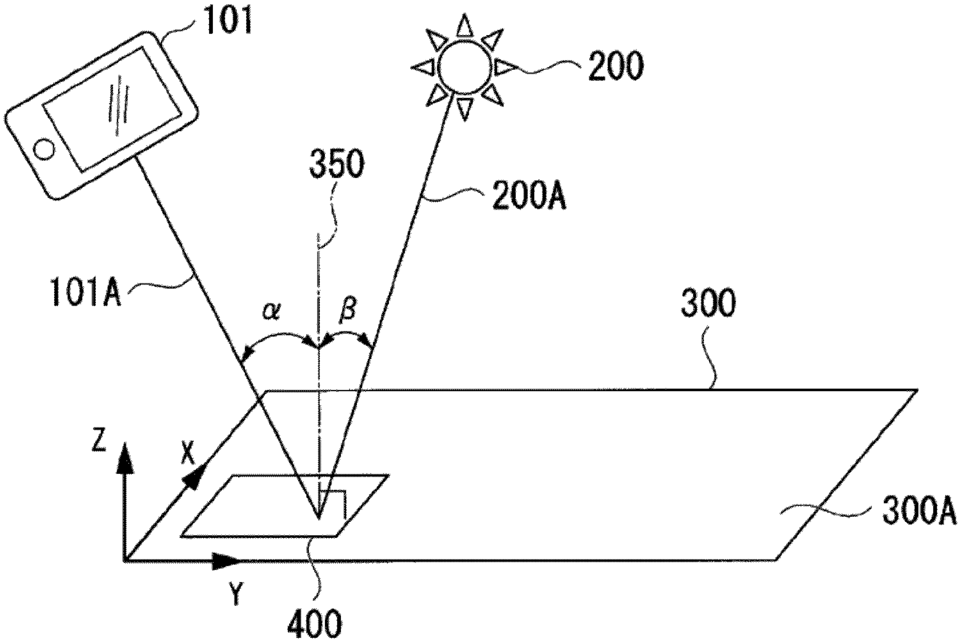
FIG. 3 illustrates an observation angle at which an imaging unit 101 observes an anti-counterfeiting medium.

FIG. 3 illustrates an observation angle at which the imaging unit 101 observes an anti-counterfeiting medium. Referring to FIG. 3, an anti-counterfeiting medium 400 is used to prevent counterfeiting and copy of negotiable securities such as bank bills, stock certificates, cash vouchers including merchandise certificates, and credit cards, and products such as medicines, food, luxury brand-name items, for example. The anti-counterfeiting medium 400 is directly printed on or transferred to such cash vouchers and negotiable securities or printed on or transferred to seals or tags attached to such products (or to product packages).

Referring to FIG. 3, the anti-counterfeiting medium 400 is provided on the surface of a credit card 300. In this embodiment, for example, the anti-counterfeiting medium 400 may be a diffraction grating or a hologram that varies in color and pattern depending on the observation angle, and may be formed by an optically variable device (OVD) ink or pearl pigment that varies in color and brightness depending on the observation angle. A light source (also called an illuminator) 200 irradiates the anti-counterfeiting medium 400 with imaging light at an emission angle $\beta$ formed by a light emission direction 200A and a normal 350. With the incident imaging light, the anti-counterfeiting medium emits a predetermined light pattern. An imaging angle $\alpha$ is formed by the imaging direction of the imaging unit 101 and the normal 350. The light pattern emitted from the anti-counterfeiting medium corresponding to the emitted light varies depending on the imaging angle $\alpha$ and the emission angle $\beta$.

The normal 350 indicates the planar direction of a surface 300A of the credit card 300. An imaging angle $\alpha$ is formed by an imaging direction 101A of the imaging unit 101 and the normal 350. For example, the observation angle estimation unit 106 arranges the credit card in a three-dimensional coordinate system such that a z axis is set in a direction parallel to the normal 350 and the sides of the credit card 300 are parallel to an x axis and a y axis. For example, the observation angle estimation unit 106 arranges the credit card 300 in a two-dimensional plane with the x axis and the y axis in the three-dimensional coordinate system such that any of vertexes formed by the sides of the credit card 300 coincides with an origin point O in the three-dimensional coordinate system. Accordingly, the thickness direction of the credit card 300 is parallel to the z axis. The three-dimensional shape of the credit card 300 is written and stored in advance as known information together with the coordinate conversion equation described above in the image data storage unit 112.

The anti-counterfeiting medium 400 will be described here in detail.

The anti-counterfeiting medium 400 may be a hologram that emits various types of diffracted light depending on the diffraction structure. In this case, the hologram may be any of various types of holograms such as reflection type, transmissive type, phase type, and volume type.

Hereinafter, an example of a relief-type concave-convex structure will be mainly described.

Figure 4:
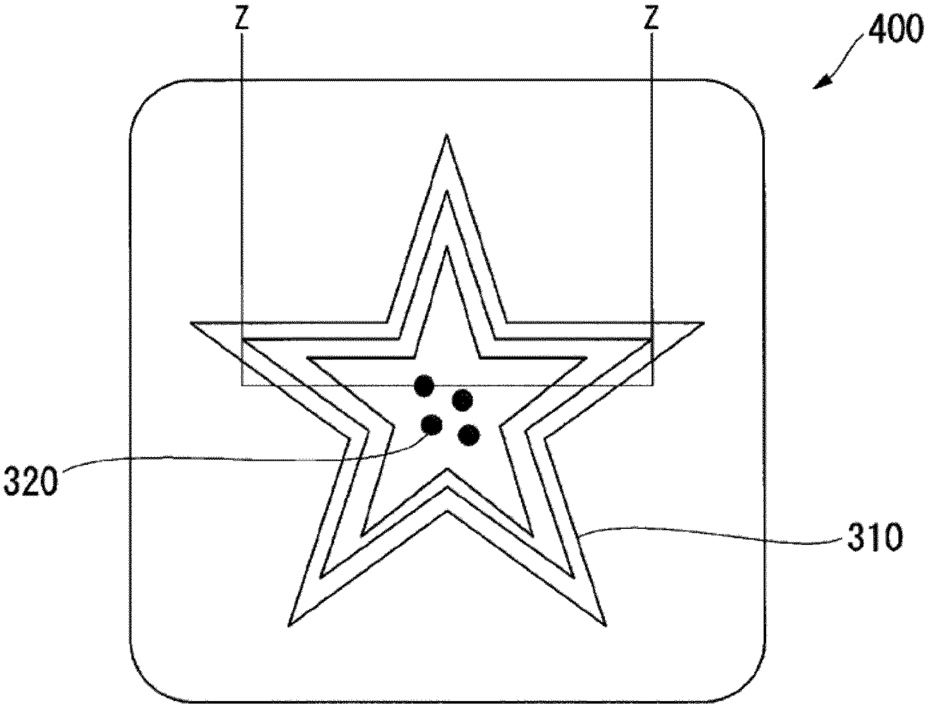
FIG. 4 is a schematic plan view of an anti-counterfeiting medium according to the first embodiment.
Figure 5:
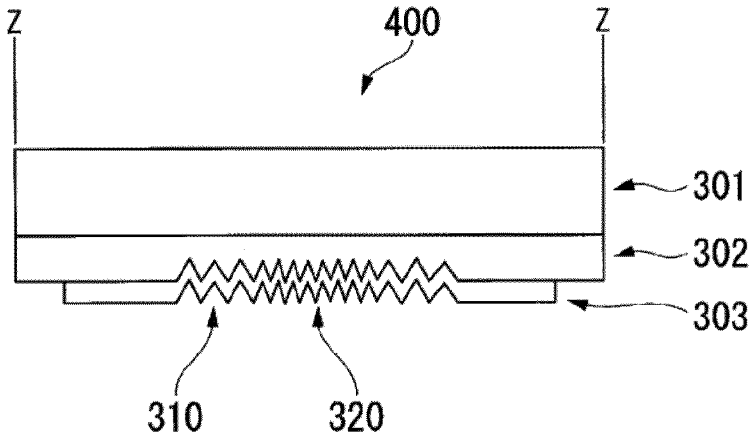
FIG. 5 is a schematic cross-sectional view of the anti-counterfeiting medium illustrated in FIG. 4 taken along line Z-Z.

As a method for forming a concave-convex structure such as a first concave-convex structure part 310 and a second concave-convex structure part 320 formed in a relief structure formation layer 302 as illustrated in FIGS. 4 and 5, various methods can be used such as radiation curing molding, extrusion molding, or thermal press molding, using a metallic stamper or the like.

The first concave-convex structure part 310 may be a relief-type diffraction grating structure with groove-like portions including concave portions or convex portions or may be a directive scattering structure with a combination of a plurality of regions where a plurality of straight convex portions or concave portions are aligned in one direction and the direction of alignment is different among the regions.

Most general diffraction gratings used for displays have a spatial frequency of 500 to 1600 line pairs/mm, and can display different colors to a user observing from a certain direction depending on the spatial frequency or orientation of the diffraction grating.

Figure 8:
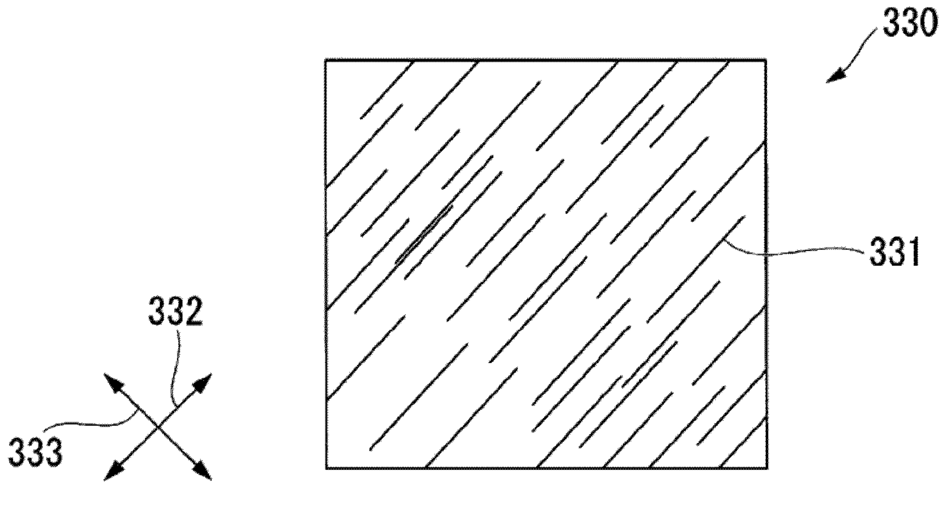
FIG. 8 is a perspective view of an example of a first concave-convex structure part of the anti-counterfeiting medium according to the first embodiment.

The directive scattering structure includes a plurality of light scattering structures 331 that has a constant alignment direction 332 in a specific segment or cell as illustrated in FIG. 8. These light scattering structures 331 are linear in shape and are arranged in almost parallel in the specific segment or cell.

However, the light scattering structures 331 do not need to be completely parallel to each other but the longitudinal side of some of the light scattering structures 331 and the longitudinal side of some other of the light scattering structures 331 may cross each other as far as the region of the directive scattering structure 330 has sufficiently anisotropic scattering power.

With the foregoing structure, when the region including the directive scattering structure 330 is irradiated with light from an oblique direction perpendicular to the alignment direction 332 and is observed from the front side, the region looks relatively bright due to the high light scattering power.

In contrast, when the region including the directive scattering structure 330 is irradiated with light from an oblique direction perpendicular to a light scattering axis 333 and is observed from the front side, the region looks relatively dark due to the low light scattering power.

Therefore, setting the alignment direction 332 in a segment or cell or in each of segments or cells including the light scattering structures 331 forms a pattern with a combination of a relatively bright part and a relatively dark part. The reversals of the bright and dark parts can be observed with changes in observation position and light irradiation position.

The first concave-convex structure part 310 may have the relief-type diffraction grating structure or the directive scattering structure described above singly or in combination, but the first concave-convex structure part 310 is not limited to the foregoing structures.

Figure 6:
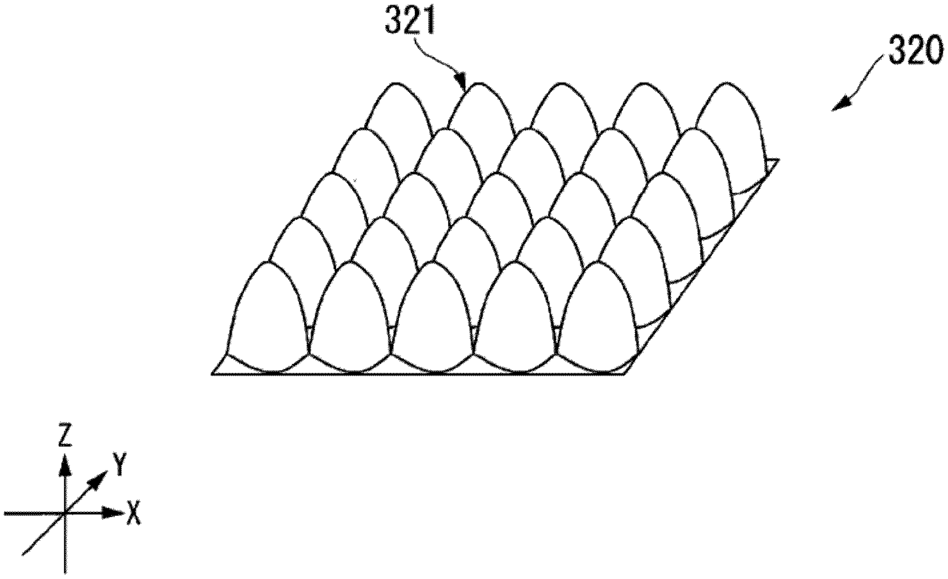
FIG. 6 is a perspective view of an example of a second concave-convex structure part of the anti-counterfeiting medium according to the first embodiment.

FIG. 6 is a perspective view of an example of a structure applicable to the second concave-convex structure part 320.

The second concave-convex structure part 320 of FIG. 6 has a plurality of convex portions 321. In this case, the second concave-convex structure part 320 is formed from only the plurality of convex portions 321, but this is a mere example and the second concave-convex structure part 320 may be formed from a plurality of concave portions in this embodiment.

The surface area of concave portions or convex portions provided in the second concave-convex structure part 320 in this embodiment is preferably 1.5 times or more larger than the area occupied by the concave portions or convex portions provided on the surface of the relief structure formation layer 302.

Setting the surface area of the concave portions or convex portions to be 1.5 times or more larger than the occupied area on the surface of the relief structure formation layer 302 makes it possible to obtain favorable low reflectance and low scattering properties. This is because the surface area has a color tone clearly different from that in the first concave-convex structure part, which makes it easy to recognize the surface area imaged by the imaging unit 101. On the other hand, the surface area of the concave portions or convex portions smaller than 1.5 times the occupied area is not preferred because of increased reflectance.

The plurality of concave portions or convex portions in the second concave-convex structure part 320 formed on the relief structure formation layer 302 has desirably a forward tapered shape.

The forward tapered shape here refers to a shape in which the cross section of a concave portion or convex portion parallel to the base material surface is formed in such a manner as to decrease from the base end to the leading end of the concave portion or convex potion. Specifically, the forward tapered shape may be a circular cone, a pyramid, an elliptic cone, a column or cylinder, a square column or square cylinder, a truncated circular cone, a truncated pyramid, a truncated elliptic cone, a shape in which a circular cone is joined to a column or cylinder, a shape in which a pyramid is joined to a square column or square cylinder, a hemisphere, a semi-ellipse, a bullet, or a bowl.

Figure 7:
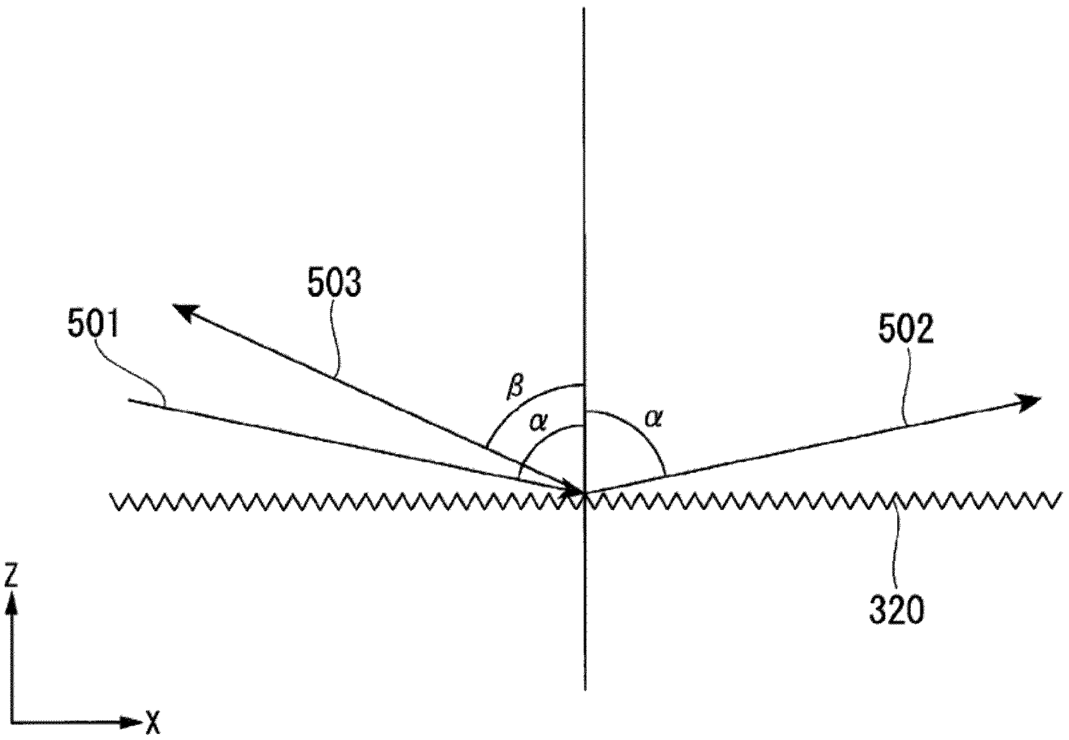
FIG. 7 schematically illustrates the state in which the second concave-convex structure part emits diffracted light.

In the case where the center-to-center distance of the adjacent concave portions or convex portions is constant in the second concave-convex structure part 320 as illustrated in FIG. 6, when the second concave-convex structure part 320 is irradiated with light as illustrated in FIG. 7, the second concave-convex structure part 320 emits diffracted light in a specific direction with respect to the traveling direction of incident light 501.

In general, diffracted light can be expressed by the following equation:

$$d(\sin\alpha \pm \sin\beta) = n\lambda$$

where d represents the center-to-center distance between the concave portions or convex portions, λ represents the wavelength of the incident light and the diffracted light, a represents the incident angle of the incident light, β represents the emission angle of the diffracted light, and n represents the order. The most typical diffracted light is first-order diffracted light and thus n can be considered to be 1.

The incident angle α can be considered as the same as the emission angle of zero-order diffracted light, that is, specular reflection light, and α and β are set in the direction of normal to the display, that is, the clockwise direction from the Z axis illustrated in FIG. 5 as forward direction. Accordingly, the equation (1) can be expressed as follows:

$$d(\sin\alpha - \sin\beta) = \lambda \tag{2}$$

Therefore, when the center-to-center distance d between the concave portions or convex portions and the incident angle, that is, the incident angle α of the zero-order diffracted light are constant, the emission angle β of first-order diffracted light 503 varies depending on the wavelength λ as is clear from the equation (2). Therefore, when the illumination light is white light, the color of imaging by the imaging unit 101 varies with changes in the observation angle of the concave-convex structure part.

The second concave-convex structure part 320 is formed in a forward tapered shape with a center-to-center distance of 400 nm or less between the individual concave portions or convex portions, and thus the second concave-convex structure part 320 is imaged almost as black from the direction of the normal. On the other hand, under a specific condition, that is, in an environment where the incident angle α of the white light is 60 to 90°, the emission angle |β| of the first-order diffracted light with a specific wavelength can be designed to be close to the incident angle.

For example, when the incident angle α is 60° and d is 340 nm, the emission angle IN becomes about 64° at a λ of 600 nm.

On the other hand, the first concave-convex structure part 310 is a diffraction grating structure or the like and thus it is difficult to set the emission angle of the first-order diffracted light close to the incident angle.

Accordingly, the relatively close proximity of the light source 200 and the imaging unit 101 makes it possible to catch clear color changes in the second concave-convex structure part 320 under the specific condition in the identification process by the authenticity determination device 1.

Further, the anti-counterfeiting medium 400 may be configured such that surface plasmon propagation is caused by providing nanometer-size fine pores or fine structures on the surface, or may be configured to use structural colors for controlling the colors of the reflection light and transmission light resulting from the incident light by controlling the depth of the concave-convex structure.

In addition, for example, the anti-counterfeiting medium 400 may be configured to use the retroreflective properties of microspheres or spherical structures, or may be configured to act as an angle control mirror that reflects/transmits the incident light only in a specific direction by forming a gradient on the surface structure of a micro area to impart surface reflection properties, or may be configured to act as printed matter provided with concave and convex portions by intaglio printing.

Further, for example, the anti-counterfeiting medium 400 may be configured to limit the field of vision by arranging a large number of high walls for use in a peep prevention film or the like in a narrow region, or may be configured in a parallax barrier form in which the field of vision is limited by providing narrow lines on a plane at specific intervals so that an image formed in the depth of the plane appears modified, or may be configured such that a lenticular lens array or a micro lens array is used to make the image formed in the depth of the lens appear modified.

The anti-counterfeiting medium 400 may be provided with a pearl pigment of mica coated with a metallic oxide by printing or the like, for example.

For example, the anti-counterfeiting medium 400 may be configured such that a multi-layer thin film is formed by layering a plurality of thin films of transparent materials and metals different in refractive index to change in color depending on the reflection angle and transmission angle of the incident light due to an interference phenomenon, or may be configured such that a multi-layer thin film is crushed and flaked, and provided as a pigment by printing or the like, or may be configured such that fine particles are coated with a thin film by chemical treatment or the like to cause an interference phenomenon and are provided by printing or the like, or may be configured such that a liquid crystal material typified by cholesteric liquid crystal is fixed by polymers or the like. The liquid crystal material may be a planar liquid crystal material or a liquid crystal material that is turned into a pigment by crushing and then provided by printing or the like.

For example, the anti-counterfeiting medium 400 may include a magnetic oriented material with directivity in reflection light and transmission light provided by orienting a magnetic body typified by iron oxide, chrome oxide, cobalt, or ferrite by magnetic force and forming the magnetic body in a planar form, or may be configured such that the magnetic oriented material as a core is subjected to chemical treatment or the like as described above to form a multi-layered film, or may be configured to use an optical effect produced by nanometer-size particles typified by silver nano particles or quantum dots.

Returning to FIG. 1, when determining the observation angle of the captured image data, the observation angle estimation unit 106 reads the captured image data and the radiance value from the image data storage unit 112, and establishes correspondences between the coordinates of the three-dimensional shape of the credit card 300 in the three-dimensional coordinate system and the pixels (coordinates) in the captured image data (two-dimensional coordinate system) by the coordinate conversion equation. Accordingly, the observation angle estimation unit 106 determines the imaging coordinate value of the captured image data in the three-dimensional coordinate system in the three-dimensional space and the imaging direction of the captured image data from the imaging coordinate value. In this instance, as described above, the observation angle estimation unit 106 arranges the credit card 300 in the three-dimensional space with any of vertexes of the three-dimensional shape of the credit card 300 as an origin point in the three-dimensional coordinate system such that the normal 350 is parallel to the z axis and the sides of the credit card 300 are parallel to the x axis or the y axis.

Then, the observation angle estimation unit 106 determines the imaging coordinate value and the imaging direction of the captured image data obtained by the imaging unit 101 in the three-dimensional coordinate system with respect to the three-dimensional shape of the credit card 300. Accordingly, the observation angle estimation unit 106 determines the imaging angle $\alpha$ formed by the normal 350 and the imaging direction of the imaging unit 101. The observation angle estimation unit 106 writes and stores the determined imaging coordinate value, imaging angle, captured image data address of the captured image data together with the captured image data identification information and the radiance value of the captured image data in the captured image data table in the image data storage unit 112.

In this embodiment, the imaging unit 101 needs to undergo camera calibration in advance as a pre-requisite. The camera calibration is performed such that a calibration board of a known three-dimensional shape is imaged once or more times in an imaging area, and one or more captured image data are used to establish correspondences between a plurality of coordinate points in the three-dimensional coordinate system in the three-dimensional space and a plurality of coordinate points (two-dimensional pixels) of the captured image data in the two-dimensional coordinate system. Accordingly, the coordinate conversion equation indicating the relative positional relationship between the imaging unit 101 and the calibration board (hereinafter "external parameter"), and the optical center of the imaging unit 101, the light beam incident direction vectors of the pixels (two-dimensional pixels), and lens distortion (hereinafter "internal parameters of the imaging unit 101") are estimated.

Specifically, in this embodiment, for the observation angle estimation unit 106 described later to estimate the observation angle of the captured image data, a global coordinate system (three-dimensional coordinate system) is restructured from the two-dimensional images of the calibration board captured in advance by the imaging unit 101 from a plurality of different viewpoint directions, that is, the multi-viewpoint captured image data. Then, the coordinate conversion equation indicating the correspondences between the coordinate points in the three-dimensional coordinate system restructured by the same pixels and the coordinate points of the captured image data obtained by the imaging unit 101 in the two-dimensional coordinate system is determined during camera calibration.

As described above, in this embodiment, the observation angle is estimated assuming that the imaging unit 101 has already undergone camera calibration, the internal parameters of the imaging unit 101 are known at the time of execution of an authenticity determination process on an anti-counterfeiting medium by the identification device, and the three-dimensional shape of the authenticity determination target and the anti-counterfeiting medium is known. This makes it possible to obtain the captured image data of the anti-counterfeiting medium from a plurality of different positions, acquire the information on a plurality of corresponding points between the coordinate points in the three-dimensional coordinate system and the pixels of the captured image data in the two-dimensional coordinate system by the coordinate conversion equation, and estimate the relative positional relationship between the imaging unit 101 and the anti-counterfeiting medium from the plurality of corresponding point coordinates. Similarly, in the case of imaging the anti-counterfeiting medium only once, it is possible to obtain the information on a plurality of corresponding points between the coordinate points in the three-dimensional coordinate system and the pixels in the two-dimensional coordinate system from the one captured image data by the coordinate conversion equation, and estimate the relative positional relationship between the imaging unit 101 and the anti-counterfeiting medium from the plurality of coordinate point coordinates. Specifically, it is possible to estimate the observation position and observation angle (imaging direction) of the imaging unit 101 at the time of imaging the anti-counterfeiting medium.

In this embodiment, as a well-known camera calibration method, an analysis method by Z. Zhang (Z. Zhang, "A flexible new technique for camera calibration", IEEE Transactions on Pattern Analysis and Machine Intelligence, Vol. 22, No. 11, pages 1330-1334, 2000), for example, can be applied to estimate the observation angle at the time of obtaining the captured image data. However, in the case of estimating the observation angle with application of the analysis method by Z. Zhang, it is necessary to input the captured image data obtained at a focal point similar to the focal point fixed during camera calibration (desirably the identical focal point) into the identification device.

Returning to FIG. 1, the usable image selection unit 107 selects captured image data usable in an authenticity determination process from the captured image data obtained by the imaging unit 101. In this case, during selection of the captured image data usable in an authenticity determination process from the captured image data obtained by the imaging unit 101, the usable image selection unit 107 determines whether the observation angle of the captured image data falls within the determinable angle range at which an authenticity determination is possible. The usable image selection unit 107 also determines whether all the shapes of the anti-counterfeiting medium 400 have been imaged as captured image data, or the captured image data is in focus, or the distribution of a luminance histogram (described later) is appropriate, for example.

Then, the usable image selection unit 107 selects the captured image data at an imaging angle within the determinable angle at which an authenticity determination is possible and with the imaging coordinate value within the determinable coordinate value range, as the captured image data usable in an authenticity process. The usable image selection unit 107 adds determination image data identification information to the selected captured image data, and writes and stores the selected captured image data together with the captured image data identification information for the captured image data in an authenticity determination captured image data table in the image data storage unit 112.

Specifically, the usable image selection unit 107 determines whether the imaging angle determined by the observation angle estimation unit 106 described later is included in any of the predetermined setting imaging angles (for example, the imaging angle range including predetermined error). The usable image selection unit 107 also determines whether the imaging coordinate value determined by the observation angle estimation unit 106 is included in any of the predetermined setting imaging coordinate value (for example, the imaging coordinate value range including predetermined error).

FIG. 9 illustrates a configuration example of the authenticity determination captured image data table in the image data storage unit 112. The authenticity determination captured image data table in FIG. 9 writes and stores determination image data identification information, captured image data indicated by the determination image data identification information, reference image data addresses indicating the start addresses of areas where reference image data are stored, the degrees of similarity between the captured image data and the reference image data, in correspondence with one another.

In the authenticity determination captured image data table, the determination image data identification information is identification information for identifying the captured image data usable in an authenticity process. The captured image data identification information is identification information for identifying the captured image data. The reference image data addresses indicate the addresses of the areas in the image data storage unit 112 where the captured image data are stored, which constitute indexes for reading the reference image data from the image data storage unit 112. The reference image data stored at the reference image data addresses are image data for comparison with the corresponding captured image data. The degrees of similarity are numeric values that indicate the degrees of similarity between the captured image data and the reference image data. The reference image data is generated for each captured image data as described later, and in this embodiment, the reference image data is produced for each radiance value as light characteristics. The determination image data identification information is given to each of the reference image data.

Returning to FIG. 1, the reference image generation unit 108 generates the reference image data corresponding to the radiance value of the captured image data selected by the usable image selection unit 107 for comparison with the captured image data. The reference image data is image data captured from the same imaging viewpoint as the captured image data, and is determined by simulation in correspondence with the structure of the anti-counterfeiting medium 400 or from the captured image data of the anti-counterfeiting medium 400 obtained in advance. As described above, the anti-counterfeiting medium 400 may be formed from a diffraction grating or holography, or may be formed from an OVD ink containing a pigment of mica coated with a metallic oxide or a pearl pigment, or may be formed by repeatedly laminating layers different in refractive index, or may be formed from cholesteric liquid crystal.

Accordingly, the reference image generation unit 108 generates the reference image data based on the imaging viewpoint and radiance value corresponding to the foregoing individual cases. For example, when the anti-counterfeiting medium 400 is formed using a diffraction grating, the reference image generation unit 108 calculates and generates the reference image data by simulation based on the information on the design of the diffraction grating using a reference image generation function with the imaging viewpoint (imaging coordinate value and imaging angle) and radiance value as parameters. Then, the reference image generation unit 108 writes and stores the generated reference image data in the image data storage unit 112, and sets the start address of the written area as reference image data address. The reference image generation unit 108 writes and stores the reference image data address in the authenticity determination captured image data table in the image data storage unit 112, in correspondence with the captured image identification information for the captured image data to be compared.

In the case where the anti-counterfeiting medium 400 is formed from an OVD ink or a pearl pigment, or formed by repeatedly laminating layers different in refractive index, or formed from cholesteric liquid crystal and thus is not capable of data calculation using the function of the reference image data, the anti-counterfeiting medium 400 is imaged from all observation angles and the captured image data is stored as a reference image data database in the image data storage unit 112. Accordingly, the reference image generation unit 108 can read the reference image data from the database in correspondence with the observation angle of the captured image data to be compared, and write and store the reference image data in the authenticity determination captured image data table, in correspondence with the captured image identification information for the captured image data to be compared.

The similarity calculation unit 109 refers to the authenticity determination captured image data table in the image data storage unit 112 to read in sequence the captured image data identification information and reference image data address corresponding to the determination image data identification information for the same imaging target. Then, the similarity calculation unit 109 reads the captured image data address corresponding to the captured image data identification information from the captured image data table in the image data storage unit 112. Accordingly, the similarity calculation unit 109 reads the captured image data corresponding to the captured image data address and the reference image data corresponding to the reference image data address from the image data storage unit 112.

In addition, when different anti-counterfeiting media 400 are imaged, the image data storage unit 112 generates the captured image data table and the authenticity determination captured image data table for each of the kinds of the anti-counterfeiting media 400. The observation angle estimation unit 106 then adds kind identification information for identifying the kind to the individual captured image data tables. The usable image selection unit 107 generates the authentication determination captured image data tables in correspondence with the kind identification information.

The similarity calculation unit 109 calculates the degree of similarity between the captured image data and the read reference image data by template matching. The similarity calculation unit 109 determines mean square error of luminance of individual pixels (for a color image, red, green, and blue (RGB) pixels) corresponding to the captured image data and the reference image data, for example, adds the mean square error to all the pixels or some corresponding pixels, and outputs the added result as a numeric value indicating the degree of similarity. Therefore, as the numeric value of the degree of similarity is lower, the captured image data and the reference image data are more similar to each other. For some corresponding pixels, a portion of a characteristic light pattern significantly varying depending on the observation angle is selected and used in contrast to the other pixels in the reference image data.

Alternatively, the similarity calculation unit 109 may convert the RGB values of all the pixels or some corresponding pixels in the captured image data and the reference image data into an appropriate color space, add the square of the Euclidean distance in the color space, and output the added result as the degree of similarity. In this case as well as the case of using the mean square error, as the numeric value of the degree of similarity is lower, the captured image data and the reference image data are more similar to each other.

As described above, the similarity calculation unit 109 determines the degree of similarity between the captured image data and the reference image data corresponding to the captured image data in sequence corresponding to the determination image data identification information in the authenticity determination captured image data table in the image data storage unit 112. Then, the similarity calculation unit 109 writes and stores the determined degree of similarity in the authenticity determination captured image data table in the image data storage unit 112, in correspondence with the captured image data identification information for the captured image data of which the degree of similarity was determined.

When the radiance value of the illumination light used at the time of obtaining the captured image data does not correspond to the generation of the reference image data with high accuracy in the reference image generation function, that is, when the radiance value is not precisely reflected in the reference image data, the pixels cannot be simply compared.

Accordingly, the similarity calculation unit 109 may evaluate the color tones of RGB between predetermined pixels, that is, calculate mean square error between R/G between predetermined pixels in the captured image data (the ratio between R value and G value) and R/G between the pixels in the reference image data corresponding to the predetermined pixels in the captured image data, to thereby absorb the difference in the intensity of the illumination light and calculate the numerical value of the highly accurate degree of similarity. The R/G is determined between the predetermined pixels such that two pixels A and B are paired, and the R value of the pixel A is divided by the G value of the pixel B. In addition to the R/G, B/G (the ratio between B value and G value) may be used in combination. The predetermined pixels are set in advance in pairs with high R/G and B/G.

Each time the degree of similarity is written in correspondence with the determination image data identification information into the authenticity determination captured image data table, the authenticity determination unit 110 reads sequentially the degree of similarity corresponding to the determination image data identification information from the authenticity determination captured image data table. Then, the authenticity determination unit 110 compares each of the degrees of similarity corresponding to the read determination image data identification information with a preset similarity threshold. The similarity threshold is determined in advance such that the degree of similarity between captured image data obtained at an arbitrary imaging viewpoint (the imaging coordinate value falls within the imaging coordinate value range and the imaging angle falls within the imaging angle range as described above) and with an arbitrary radiance value and reference image data determined corresponding to the imaging viewpoint and radiance value of the captured image data are calculated for a plurality of imaging viewpoints and with a plurality of radiance values, and an experimental value exceeding the degree of similarity between the captured image data and the reference image data at the same imaging viewpoint and with the same radiance value is set. The different similarity thresholds are determined for the imaging coordinate value, the imaging angle, and the radiance value. The authenticity determination unit 110 performs an authenticity determination process on an anti-counterfeiting medium using the similarity thresholds corresponding to the imaging viewpoint (imaging angle and imaging coordinate value) and the radiance value.

In addition, the authenticity determination unit 110 determines the degree of similarity of one to more captured image data. When the degree of similarity between even one captured image data and the corresponding reference image data is equal to or more than the similarity threshold, the authenticity determination unit 110 determines that the credit card 300 (authenticity determination target) with the anti-counterfeiting medium 400 is false (fake). On the other hand, the authenticity determination unit 110 determines the degree of similarity of the captured image data for each of the radiance values. When the degrees of similarity of the captured image data with all the radiance values are lower than the similarity threshold, the authenticity determination unit 110 determines the credit card 300 (authenticity determination target) with the anti-counterfeiting medium 400 is real (genuine). The number of captured image data for use in authenticity determination, that is, the number of kinds of radiance values is preset.

When image capture for authenticity determination is performed in a video mode, the authenticity determination unit 110 may use, out of frame images of the anti-counterfeiting medium captured as moving images, frame images corresponding to the imaging viewpoint of the reference image data.

The display unit 111 is a liquid crystal display, for example, that displays an image on its display screen. The authenticity determination unit 110 causes the display unit 111 to display the result of the authenticity determination that the article with the anti-counterfeiting medium is real (genuine) or false (not genuine) on the display screen of the display unit 111.

The image data storage unit 112 writes and stores the captured image data, the reference image data, the captured image data tables, and the authenticity determination captured image data tables as described above.

At the time of imaging the anti-counterfeiting medium, the imaging control unit 102 determines whether the imaging viewpoint falls within a preset range of imaging viewpoint (imaging coordinate value and imaging angle), that is, an imaging coordinate value range and an imaging angle range. The imaging angle range here indicates a range of different observation angles at which different colors or light patterns can be observed in a diffraction grating or a hologram. When the observation angle falls outside the imaging angle range, no optical phenomenon inherent in the anti-counterfeiting medium is observed, and thus it is not possible to determine authenticity of the anti-counterfeiting medium. The imaging coordinate value range indicates the coordinate values in which all the light patterns of a diffraction grating or hologram as an anti-counterfeiting medium are included in the captured data in the three-dimensional coordinate system at the time of imaging the anti-counterfeiting medium.

In this instance, the imaging control unit 102 causes the observation angle estimation unit 106 to estimate the imaging angle corresponding to the imaging coordinate value and imaging direction of the imaging unit 101 in the three-dimensional coordinate system. When the imaging coordinate value and the imaging angle estimated by the observation angle estimation unit 106 respectively fall within the imaging coordinate value range and the imaging angle range, the imaging control unit 102 determines that the condition for imaging viewpoint in the imaging process is satisfied. On the other hand, when the estimated imaging coordinate value and imaging angle respectively fall outside the imaging coordinate value range and the imaging angle range, the imaging control unit 102 determines that the condition for imaging viewpoint in the imaging process is not satisfied, and then displays a notification on the display screen of the display unit 111 that the captured image data is not usable for an authenticity determination due to non-satisfaction of the imaging viewpoint condition, thereby prompting the user to adjust the imaging viewpoint.

At the time of setting an exposure condition as an imaging condition in the imaging unit 101, the imaging control unit 102 generates a luminance histogram. The imaging control unit 102 uses the generated luminance histogram to determine whether the distribution of pixel values in the captured image data indicating the distribution of value of the individual pixels is too far to the high pixel value side or the low pixel value side. For example, when the distribution of pixel values in the luminance histogram is too far to the low pixel value side, that is, when the pixel value is expressed in 256 levels of 0 to 255 and the captured image includes many pixels with a value around 0, the captured image data will have black crushing and cannot be compared with the reference image data. On the other hand, when the distribution of the pixel values in the luminance histogram is too far to the high pixel value side, that is, when the captured image data includes pixels with a value around 255, the captured image data will have a whiteout and cannot be compared with the reference image data.

Accordingly, it is necessary to set the exposure condition such that the distribution of the luminance histogram resides around the middle in the range of 0 to 255.

The imaging control unit 102 determines whether the illuminator needs to be adjusted based on the distribution of the pixel values of the luminance histogram. When black crushing is expected to occur and the illuminator needs to be adjusted to shift the distribution of the luminance histogram to the high pixel value side, the imaging control unit 102 causes the exposure control unit 103 to illuminate the anti-counterfeiting medium 400 with light of a predetermined intensity from the illumination unit 104 during image capture (for example, irradiate the anti-counterfeiting medium 400 with flash light of a predetermined radiance value (light intensity). In addition, when the authenticity determination device 1 does not have the exposure control unit 103 and the illumination unit 104, the imaging control unit 102 outputs to the light characteristics control unit 105 a control signal for irradiating the anti-counterfeiting medium 400 with light of a necessary radiance value.

On the other hand, when a whiteout is expected to occur and the illuminator needs to be adjusted to shift the distribution of the luminance histogram to the low pixel value side, the imaging control unit 102 causes the exposure control unit 103 to irradiate the anti-counterfeiting medium 400 with light of a predetermined intensity from the illumination unit 104 during image capture.

In the foregoing process, an exposure control table describing the distribution state of the luminance histogram and the exposure condition corresponding to the distribution state and the control conditions such as the intensity of the illuminator may be generated and written in advance in the image data storage unit 112. In this case, the imaging control unit 102 searches the exposure control table in the image data storage unit 112 for the luminance histogram similar to the pattern of the luminance histogram of the captured image data to be obtained, reads information on the exposure condition and the control conditions such as the intensity of the illuminator for the captured image data to be obtained, outputs the exposure condition to the exposure control unit 103, and outputs the control conditions such as the intensity of the illuminator to the light characteristics control unit 105, thereby controlling the exposure and the radiance value of the radiation light during image capture.

The light characteristics control unit 105 also drives the illumination unit 104 corresponding to the radiance value of the radiation light supplied from the imaging control unit 102. The reference image generation unit 108 generates the reference image data corresponding to the radiance value of the light emitted by the light characteristics control unit 105.

In addition, the exposure control unit 103 may be provided with an illuminance sensor so that the exposure condition and the illuminance of the illuminator can be set according to the illuminance measured by the illuminance sensor. In this case, an exposure control table describing the illuminance, the exposure condition corresponding to the illuminance, and the control conditions such as the intensity of the illuminator may be generated and written in advance in the image data storage unit 112. In this case, in correspondence with the illuminance at the time of obtaining the captured image data, the imaging control unit 102 searches the exposure control table in the image data storage unit 112, reads the exposure condition for the captured image data to be obtained and the control conditions such as the radiance value of the light to be radiated, outputs the exposure condition to the exposure control unit 103, outputs the control conditions such as the intensity of the illuminator to the light characteristics control unit 105, to thereby control the exposure and the radiance value of the radiation light during image capture.

Figure 10:
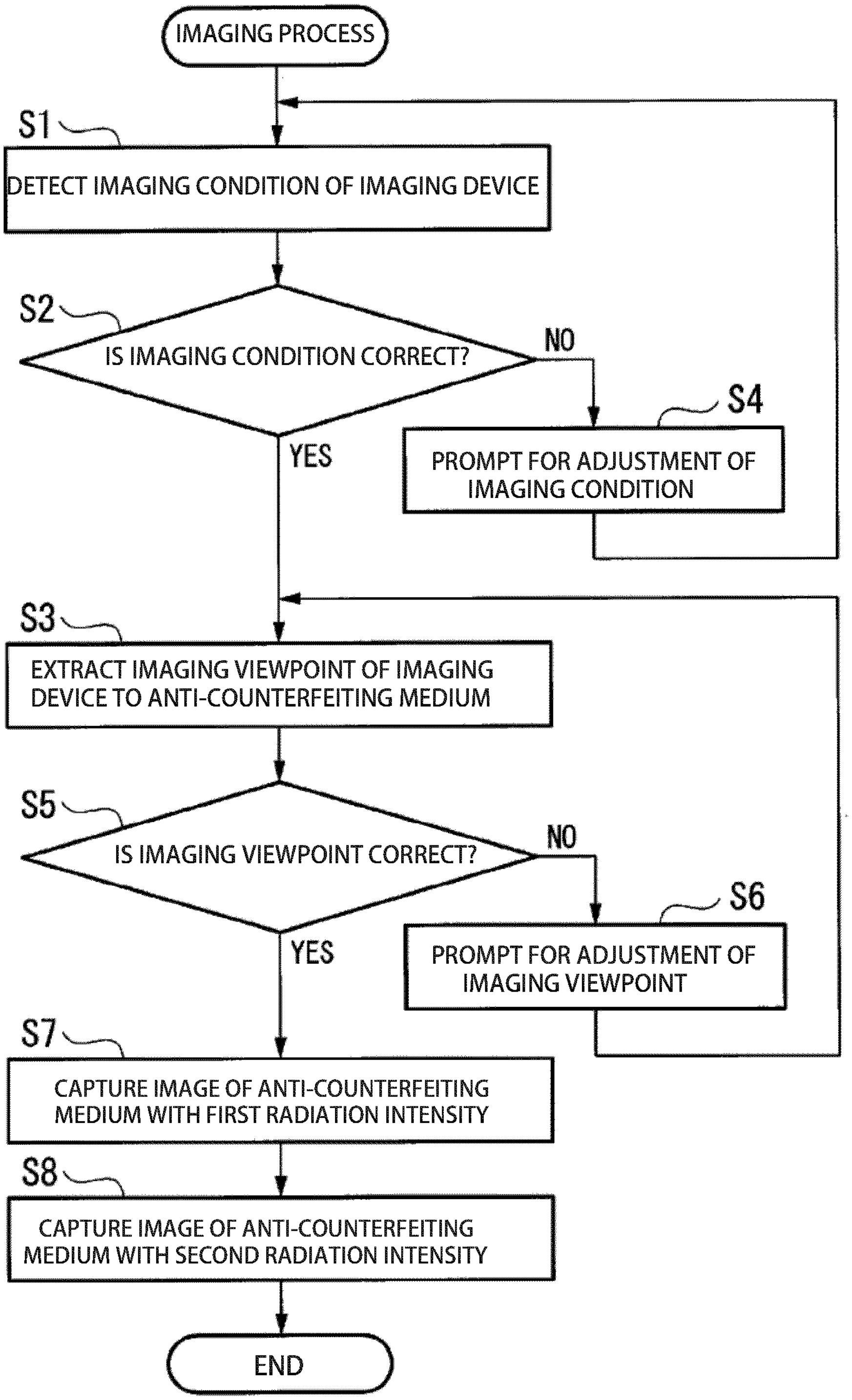
FIG. 10 is a flowchart of an example of operations for obtaining captured image data for use in an authenticity determination process on an authenticity determination target with an anti-counterfeiting medium in the identification device according to the first embodiment.

FIG. 10 is a flowchart of an example of operations for obtaining the captured image data for use in an authenticity determination process on an authenticity determination target with an anti-counterfeiting medium in the identification device according to the first embodiment. In the steps for obtaining the captured image data described below, the captured image data is obtained corresponding to the number of kinds of radiance values in the preset imaging viewpoints, in this embodiment, two kinds of radiance values.

Step S1:

The imaging control unit 102 detects the current imaging condition, for example, the exposure condition, for the authenticity determination target in the imaging unit 101.

Step S2:

The imaging control unit 102 determines whether all the imaging conditions such as the exposure condition constitute conditions under which captured image data can be obtained with quality capable of comparison with the reference image data.

When determining that the imaging conditions allow the obtainment of captured image data with quality capable of comparison with the reference image data, the imaging control unit 102 advances the process to step S3. On the other hand, when determining that the imaging conditions do not allow the obtainment of captured image data with quality capable of comparison with the reference image data, the imaging control unit 102 advances the process to step S4.

Step S3:

The imaging control unit 102 causes the observation angle estimation unit 106 to extract the coordinate value of the anti-counterfeiting medium 400 in the captured image data, and the imaging coordinate value and imaging angle of the imaging unit 101 in the three-dimensional coordinate system. Thus, the observation angle estimation unit 106 obtains the three-dimensional shape of the credit card 300 (authenticity determination target) in the imaging range of the imaging unit 101. Then, the observation angle estimation unit 106 compares the obtained three-dimensional shape of the credit card 300 with the prestored three-dimensional shape of the credit card 300 to extract the region of the anti-counterfeiting medium 400 in the imaging range of the imaging unit 101. The observation angle estimation unit 106 determines the imaging angle of the imaging unit 101 to the anti-counterfeiting medium 400 from the coordinate value of the anti-counterfeiting medium 400 and the imaging coordinate value and imaging direction of the imaging unit 101. The observation angle estimation unit 106 then outputs the determined imaging coordinate value and imaging angle to the imaging control unit 102.

Step S4:

The imaging control unit 102 displays unsatisfied ones of the imaging conditions on the display screen of the display unit 111 to prompt the user to adjust the unsatisfied imaging conditions.

Step S5:

The imaging control unit 102 determines whether the imaging coordinate value and the imaging angle of the imaging viewpoint of the imaging unit 101 respectively fall within the preset imaging coordinate value range and imaging angle range suitable for imaging the anti-counterfeiting medium 400, that is, whether the imaging viewpoint of the imaging unit 101 correctly corresponds to the preset imaging viewpoint.

In this instance, when determining that the imaging viewpoint of the imaging unit 101 is correct, that is, when the imaging coordinate value of the imaging unit 101 falls within the imaging coordinate value range and the imaging angle of the imaging unit 101 falls within the imaging angle range, the imaging control unit 102 advances the process to step S7. On the other hand, when determining that the imaging viewpoint of the imaging unit 101 is incorrect, that is, the imaging coordinate value of the imaging unit 101 does not fall within the imaging coordinate value range, or the imaging angle of the imaging unit 101 does not fall within the imaging angle range, or both the imaging coordinate value and the imaging angle do not respectively fall within the imaging coordinate value range and the imaging angle range, the imaging control unit 102 advances the process to step S6.

Step S6:

The imaging control unit 102 displays a notification of a necessity for adjusting the imaging viewpoint of the imaging unit 101 such that the imaging viewpoint of the imaging unit 101 falls within the preset range of the anti-counterfeiting medium on the display screen of the display unit 111, thereby prompting the user to change the imaging viewpoint.

Step S7:

The imaging control unit 102 outputs a control signal indicative of a first imaging timing to the imaging unit 101, the exposure control unit 103, and the light characteristics control unit 105.

Accordingly, the exposure control unit 103 controls exposure in the imaging unit 101. The light characteristics control unit 105 outputs to the illumination unit 104 a control signal that causes the illumination unit 104 to emit light of a first radiance value corresponding to the first imaging timing. The illumination unit 104 radiates the light of the first radiance value supplied from the light characteristics control unit 105.

Then, the imaging unit 101 performs an imaging process on the imaging target to generate first captured image data including an image of the anti-counterfeiting medium, and outputs the first captured image data to the imaging control unit 102.

The imaging control unit 102 writes the first captured image data supplied from the imaging unit 101 into the image data storage unit 112, adds the captured image data identification information to a first captured image data table, and writes and stores the captured image data address and the first radiance value in the captured image data table in the image data storage unit 112.

The observation angle estimation unit 106 writes and stores the imaging coordinate value and the imaging angle in the captured image data table in the image data storage unit 112.

Step S8:

After a lapse of a predetermined period of time since the output of the first timing, the imaging control unit 102 outputs a control signal indicative of a second imaging timing to the imaging unit 101, the exposure control unit 103, and the light characteristics control unit 105.

Accordingly, the exposure control unit 103 controls exposure in the imaging unit 101. The light characteristics control unit 105 outputs to the illumination unit 104 a control signal that causes the illumination unit 104 to emit radiation light of a second radiance value corresponding to the second imaging timing. The illumination unit 104 radiates the light of the second radiance value supplied from the light characteristics control unit 105.

Then, the imaging unit 101 performs an imaging process on the imaging target to generate second captured image data including an image of the anti-counterfeiting medium, and outputs the second captured image data to the imaging control unit 102.

The imaging control unit 102 writes the second captured image data supplied from the imaging unit 101 into the image data storage unit 112, adds the captured image data identification information to the second captured image data table, and writes and stores the captured image data address and the second radiance value in the captured image data table in the image data storage unit 112.

The observation angle estimation unit 106 writes and stores the imaging coordinate value and the imaging angle in the captured image data table in the image data storage unit 112.

Figure 11:
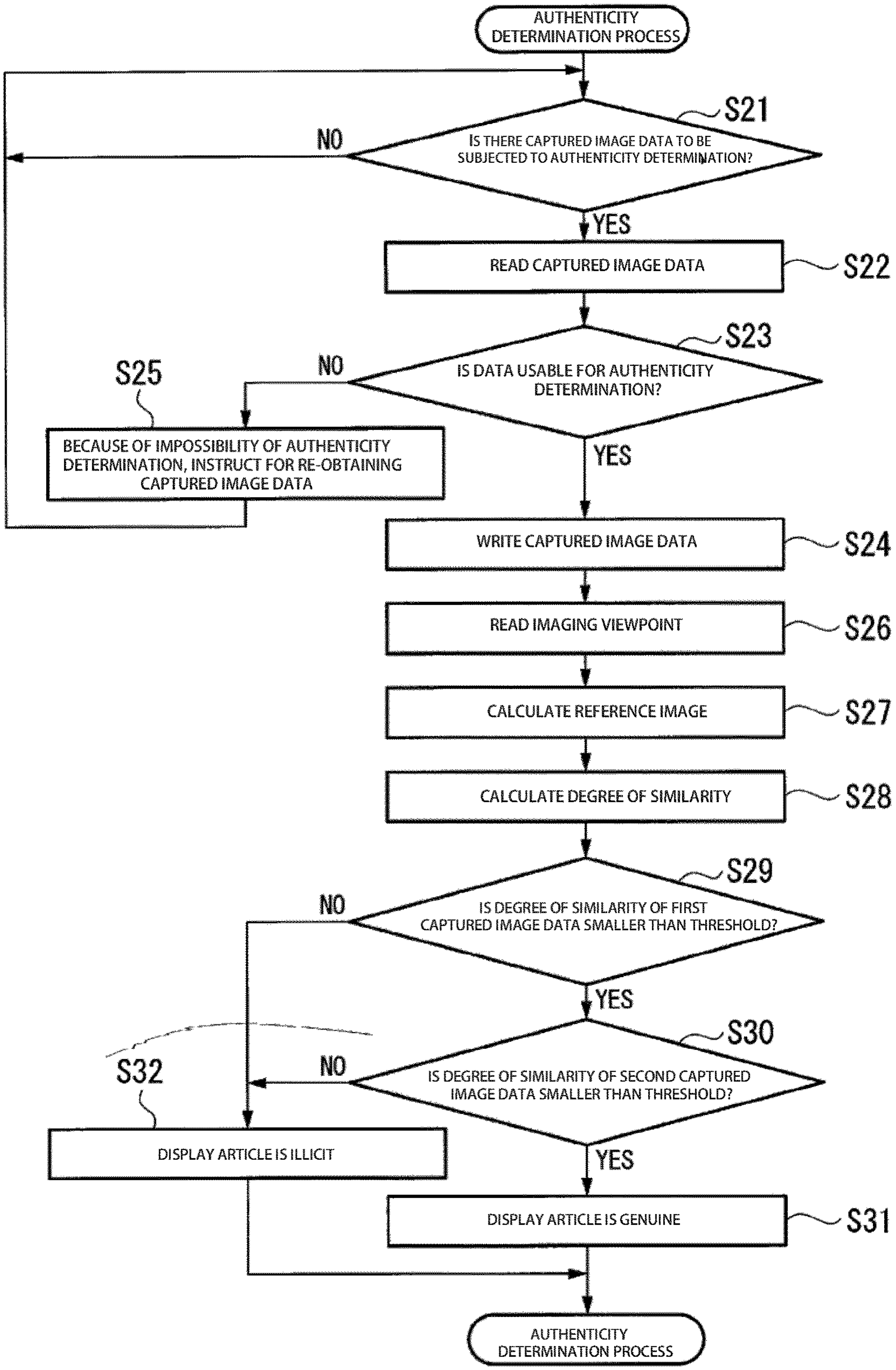
FIG. 11 is a flowchart of an example of operations for an authenticity determination process on an authenticity determination target with an anti-counterfeiting medium in the identification device according to the first embodiment.

FIG. 11 is a flowchart of an example of an authenticity determination process on an authenticity determination target with an anti-counterfeiting medium in the identification device according to the first embodiment.

Step S21:

The usable image selection unit 107 determines whether there is any the captured image data to be processed (the first captured image data and the second captured image data) in the captured image data table in the image data storage unit 112.

In this instance, when there is captured image data to be processed in the captured image data table, the usable image selection unit 107 advances the process to step S22. On the other hand, when there is no captured image data to be processed in the captured image data table, that is, when either or both of the first captured image data and the second captured image data do not exist, the usable image selection unit 107 repeatedly performs step S21. In this case, the usable image selection unit 107 determines whether both the first captured image data table and the second captured image data table are available.

Step S22:

The usable image selection unit 107 reads the captured image data addresses of the first captured image data and the second captured image data from the captured image data table in the image data storage unit 112.

The usable image selection unit 107 then reads sequentially the first captured image data and the second captured image data by the read captured image data addresses from the image data storage unit 112 and uses the read data to determine whether comparison with the reference image data is possible.

Step S23:

The usable image selection unit 107 determines whether each of the read captured image data is capable of comparison with the reference image data.

In this case, the usable image selection unit 107 determines whether all the shapes of the anti-counterfeiting medium 400 have been imaged in the first captured image data and the second captured image data, or whether the captured image data are in focus, or whether the distribution of the luminance histogram is appropriate. When each of the first captured image data and the second captured image data is capable of comparison with each of the corresponding reference image data, the usable image selection unit 107 advances the process to step S24. On the other hand, when the captured image data are incapable of comparison with the reference image data, the usable image selection unit 107 advances the process to step S25.

Step S24:

When determining that the comparison is possible, the usable image selection unit 107 adds determination image data identification information to the captured image data. The usable image selection unit 107 then writes and stores the captured image data identification information for the captured image data together with the added determination image data identification information in the authenticity determination captured image data table in the image data storage unit 112.

Step S25:

When determining that the comparison is not possible, the usable image selection unit 107 returns the process to step S21 to perform again the process for obtaining the captured image data.

In this instance, the usable image selection unit 107 may be configured to change the imaging viewpoint and display a notification for prompting for imaging the anti-counterfeiting medium 400 on the display screen of the display unit 111. This notification is for obtaining captured image data under appropriate imaging conditions such as focal length, focus, and the distribution of the luminance histogram. Displaying the notification to the user allows the user to recognize that it is necessary to change the imaging conditions of the imaging unit 101 and capture again an image of the anti-counterfeiting medium 400 to advance the authenticity determination process. In this instance, the usable image selection unit 107 deletes the first captured image data, the second captured image data, and related data from the captured image data table in the image data storage unit 112.

Step S26:

The observation angle estimation unit 106 reads the respective captured image data identification information for the first captured image data and the second captured image data from the authenticity determination captured image data table in the image data storage unit 112. The observation angle estimation unit 106 then reads the imaging coordinate value, imaging angle, and radiance value of the first captured image data and the imaging coordinate value, imaging angle, and radiance value of the second captured image data corresponding to the captured image data identification information.

Step S27:

The reference image generation unit 108 calculates and generates first reference image data corresponding to the first captured image data and second reference image data corresponding to the second captured image data, based on the imaging coordinate values, imaging angles, and radiance values of the first captured image data and the second captured image data, by predetermined simulation using the reference image generation function described above or the like. The reference image generation unit 108 writes and stores the generated first reference image data and second reference image data in the image data storage unit 112, and writes and stores the addresses used for writing as reference image data addresses in the authenticity determination captured image data table.

Step S28:

The similarity calculation unit 109 reads the respective captured image data identification information for the first captured image data and the second captured image data from the authenticity determination captured image data table in the image data storage unit 112 to calculate the degrees of similarity. The similarity calculation unit 109 then reads the respective captured image data addresses of the first captured image data and the second captured image data corresponding to the read captured image data identification information from the captured image data table in the image data storage unit 112. The similarity calculation unit 109 reads the first captured image data and the second captured image data corresponding to the read captured image data addresses from the image data storage unit 112.

The similarity calculation unit 109 reads the reference image data addresses corresponding to the respective captured image data identification information for the first captured image data and the second captured image data from the authenticity determination captured image data table, and reads the first reference image data and the second reference image data by the reference image data addresses from the image data storage unit 112.

The similarity calculation unit 109 then calculates a first degree of similarity between the first captured image data and the first reference image data by template matching. The similarity calculation unit 109 also calculates a second degree of similarity between the second captured image data and the second reference image data by template matching as with the first degree of similarity.

The similarity calculation unit 109 writes and stores the calculated first degree of similarity and second degree of similarity in the authenticity determination captured image data table in the image data storage unit 112 in correspondence with the captured image data identification information.

Step S29:

The authenticity determination unit 110 reads the first degree of similarity corresponding to the first captured image data from the authenticity determination captured image data table in the image data storage unit 112 to make an authenticity determination, and determines whether the read first degree of similarity is smaller than a preset similarity threshold (first similarity threshold). The similarity threshold is provided for each of the first radiance value (that is, the first degree of similarity) and the second radiance value (the second degree of similarity) as described above.

In this case, when the first degree of similarity of the first captured image data is smaller than the similarity threshold (the first similarity threshold), the authenticity determination unit 110 advances the process to step S30, and when the first degree of similarity is equal to or greater than the similarity threshold (the first similarity threshold), the authenticity determination unit 110 advances the process to step S32.

Step S30:

The authenticity determination unit 110 reads the second degree of similarity corresponding to the second captured image data from the authenticity determination captured image data table in the image data storage unit 112 to make an authenticity determination, and determines whether the read second degree of similarity is smaller than a preset similarity threshold (second similarity threshold).

In this case, when the second degree of similarity of the second captured image data is smaller than the similarity threshold (the second similarity threshold), the authenticity determination unit 110 advances the process to step S31, and when the second degree of similarity is equal to or greater than the similarity threshold (the second similarity threshold), the authenticity determination unit 110 advances the process to step S32.

Step S31:

The authenticity determination unit 110 causes the display unit 111 to display an image indicating that the authenticity determination target is a genuine article on the display screen. The authenticity determination device 1 then terminates the authenticity determination process on the authenticity determination target.

Step S32:

The authenticity determination unit 110 causes the display unit 111 to display an image indicating that the authenticity determination target is an illicit article on the display screen. The authenticity determination device 1 then terminates the authenticity determination process on the authenticity determination target.

Application Example 1

Descriptions will be given as to a determination on an anti-counterfeiting medium formed from a diffraction rating superimposed on a black base in the foregoing process, in the case where the first radiance value indicates a predetermined light intensity and the second radiance value indicates non-radiation of light. The first reference image data corresponding to the first radiance value is generated by simulation from the first radiance value and the imaging viewpoint. On the other hand, when the second radiance value is zero, the illumination unit 104 would not irradiate light, and thus no light pattern (diffracted light) is observed in the second captured image data of the real anti-counterfeiting medium 400. Therefore, the second reference image data corresponding to the second captured image data constitutes a black image with no light pattern observed.

Therefore, when the first degree of similarity is smaller than the first threshold and the second degree of similarity is smaller than the second similarity threshold, the anti-counterfeiting medium 400 is determined as real.

On the other hand, an anti-counterfeiting medium counterfeited by printing in a black ink in imitation of a black state with no light pattern observed is determined as false because no predetermined light pattern is observed with the first radiance value and thus the first degree of similarity becomes equal to or greater than the similarity threshold.

Application Example 2

To attach the anti-counterfeiting medium 400 to a surface 300A of the credit card 300, the anti-counterfeiting medium 400 is formed such that a pattern with a Lambertian (uniform diffuse surface) property is formed as a base, and a transparent hologram (diffraction grating) is laid on the base pattern. In the foregoing configuration, when the anti-counterfeiting medium 400 is imaged from a predetermined imaging viewpoint by irradiating the anti-counterfeiting medium 400 with light of the first radiance value as a predetermined radiance value from the illumination unit 104, the first captured image data is obtained with a light pattern (diffracted light) higher in radiance value than the Lambertian base pattern. On the other hand, when the second radiance value of illumination light from the illumination unit 104 to the anti-counterfeiting medium 400 is set to zero (no light is radiated), the anti-counterfeiting medium 400 emits no diffracted light and the second captured image data with the Lambertian base pattern is obtained.

Therefore, in the foregoing configuration, when the light pattern (diffracted light) in the first captured image data obtained by radiating light of the first radiance value from a predetermined imaging viewpoint and the preset light pattern in the first reference image data coincide with each other in pattern shape and color and the Lambertian pattern in the second captured image data obtained with the second radiance value from a predetermined imaging viewpoint and the preset pattern in the second reference image data coincide with each other, the anti-counterfeiting medium 400 is determined as real.

On the other hand, in the configuration of a counterfeited anti-counterfeiting medium such that the Lambertian pattern without imaging of diffracted light is formed as a base and no transparent hologram with imaging of diffracted light is formed on the pattern, even though the anti-counterfeiting medium is irradiated with light of the first radiance value, there is no imaging of diffracted light from a transparent hologram and thus the Lambertian base pattern becomes the pattern of the first captured image data. The pattern of the first captured image data does not coincide with the light pattern of the first reference image data in pattern shape and color, and thus the anti-counterfeiting medium is determined as false.

Application Example 3

To attach the anti-counterfeiting medium 400 to the surface 300A of the credit card 300, the anti-counterfeiting medium 400 is formed such that a pale green base's film is formed and a pattern of strontium aluminate (phosphorescent material) is laid (superimposed) on the base film. An application example 3 utilizes the nature of a phosphorescent material that, after light is radiated to phosphorescence in the phosphorescent material, emits afterglow.

In the foregoing configuration, when the anti-counterfeiting medium 400 is imaged from a predetermined imaging viewpoint by irradiating the anti-counterfeiting medium 400 with light of the first radiance value as a predetermined radiance value from the illumination unit 104, the first captured image data with a vivid green light pattern is obtained.

On the other hand, in the case where the second radiance value of the illumination light from the illumination unit 104 to the anti-counterfeiting medium 400 is set to zero (no light is irradiated) after a lapse of a predetermined time since the imaging with the first radiance value, the second captured image data with a green pattern of light accumulated on the phosphorescent material and emitted from the anti-counterfeiting medium 400 and is obtained.

Therefore, in the foregoing configuration, when the light pattern (light emitted from the phosphorescent material) in the first captured image data obtained by radiating light of the first radiance value from a predetermined imaging viewpoint and the preset light pattern in the first reference image data coincide with each other in pattern shape and color and the light pattern (light emitted from the phosphorescent material) in the second captured image data obtained with the second radiance value from a predetermined imaging viewpoint and the preset pattern in the second reference image data coincide with each other in pattern shape and color, the anti-counterfeiting medium 400 is determined as real.

On the other hand, the phosphorescent material formed on the pale green base is observed in pale green. Thus, according to the configuration of a pale green anti-counterfeiting medium counterfeited by color printing, when the anti-counterfeiting medium is imaged by radiating light of the first radiance value from the illumination unit 104, the first captured image data with a vivid pale green light pattern is obtained. However, when the anti-counterfeiting medium is imaged with the second radiance value (no radiance light) from the illumination unit 104, the second captured image data with a light pattern lower in radiance value than the emission light of phosphorescence is obtained due to the absence of a phosphorescent material. The light pattern in the second captured image data does not coincide with the light pattern in the second reference image data, and thus the anti-counterfeiting medium is determined as false.

Application Example 4

To attach the anti-counterfeiting medium 400 to the surface 300A of the credit card 300, the anti-counterfeiting medium 400 is generated such that a pattern with a Lambertian property is formed as a base, and a pattern of a retroreflective material returning incident light directly to the direction of the light source is laid on the base pattern. In the foregoing configuration, when the anti-counterfeiting medium 400 is imaged from a predetermined imaging viewpoint by irradiating the anti-counterfeiting medium 400 with light of the first radiance value as a predetermined radiance value from the illumination unit 104, the first captured image data with both the Lambertian base light pattern and the light pattern of retroreflective material is obtained. On the other hand, when the anti-counterfeiting medium 400 is imaged with the second radiance value (the radiance value is zero with no radiation of light), the second captured image data with only the Lambertian base pattern is obtained.

Therefore, in the foregoing configuration, when the light patterns (both the Lambertian pattern and the pattern of retroreflective material) in the first captured image data obtained by irradiating light of the first radiance value from a predetermined imaging viewpoint and the preset light pattern in the first reference image data coincide with each other in pattern shape and color and the Lambertian pattern in the second captured image data obtained with the second radiance value from a predetermined imaging viewpoint and the preset pattern in the second reference image data coincide with each other, the anti-counterfeiting medium 400 is determined as real.

On the other hand, in the configuration of a counterfeited anti-counterfeiting medium in which a Lambertian pattern without imaging diffracted light is formed as a base and no retroreflective material is formed on the base pattern, even though the anti-counterfeiting medium is irradiated with light of the first radiance value, the Lambertian base pattern becomes the pattern of the first captured image data due to the absence of a pattern of a retroreflective material that would emit light for image formation. The Lambertian pattern does not coincide with the preset light pattern of the first reference image data in pattern shape and color, and thus the anti-counterfeiting medium is determined as false.

According to this embodiment, the first reference image data and the second reference image data different in pattern are set respectively for the first captured image data obtained by radiation light of the first radiance value and the second captured image data obtained by radiation light of the second radiance value. This makes it possible to determine as false an anti-counterfeiting medium that is counterfeited corresponding to either the first radiance value or the second radiance value by printing or the like such that a captured image of a light pattern similar to the light pattern of a real anti-counterfeiting medium is obtained from a predetermined angle.

Second Embodiment

A second embodiment of the present invention will be described with reference to the drawings.

The second embodiment is similar in configuration to the first embodiment illustrated in FIG. 1. Different operations of the second embodiment from those of the first embodiment will be described. In the second embodiment, to obtain captured image data, wavelength spectrums (the distribution of light intensity as a function of wavelength), not radiance values, are changed as a plurality of light characteristics of radiation light to be changed.

During image capture with a supply of a control signal indicating an imaging timing, with each input of a control signal, the light characteristics control unit 105 outputs to the illumination unit 104 a control signal for radiating light different in light characteristics. In this embodiment, the characteristics of radiation light will be described as wavelength spectrums of radiation light.

With each input of a control signal, the light characteristics control unit 105 controls the illumination unit 104 to emit light having different wavelength spectrums. The different wavelength spectrums are a combination of wavelength spectrums set to the degree that, when the wavelength spectrums are used as parameters to generate reference images by simulation described later, those reference images generated corresponding to the wavelength spectrums are not determined as identical. In this case, the combination of wavelength spectrums refers to a combination of wavelength spectrums of a light source with which different tristimulus values (RGB values) are observed for spectral reflectance (emission) spectrums of the anti-counterfeiting medium, for example. Accordingly, the results of authenticity determination on the reference image data in the plurality of preset wavelength spectrums and the captured image data obtained in the corresponding wavelength spectrums become highly reliable.

The illumination unit 104 adjusts the wavelength spectrum of illumination light to be emitted according to a control signal for changing the light characteristics supplied from the light characteristics control unit 105.

The reference image generation unit 108 generates the reference image data corresponding to both the imaging viewpoint estimated by the observation angle estimation unit 106 and the wavelength spectrum of the light emitted by the illumination unit 104. When layers of pigment materials different in wavelength spectrum of pattern of emission light depending on the wavelength spectrum of the radiation light are repeatedly laminated, it is not possible to calculate the reference image data using the function of the reference image data. Therefore, the anti-counterfeiting medium 400 is imaged from all observation angles in different wavelength spectrums of the radiation light, and the captured image data obtained by the radiation light in the plurality of wavelength spectrums in the same imaging viewpoint is saved as a database of reference image data in the image data storage unit 112. Accordingly, the reference image generation unit 108 reads the reference image data from the database in correspondence with the observation angle of the captured image data to be compared, and writes and stores the read reference image data in correspondence with the captured image data identification information for the captured image data to be compared, in the authenticity determination captured image data table.

In this embodiment, the radiance values in the captured image data table in the image data storage unit 112 are changed into the wavelength spectrums of the emission light (hereinafter "emission wavelength spectrums").

The similarity calculation unit 109 refers to the authenticity determination captured image data table in the image data storage unit 112 to read in sequence the captured image data identification information and the reference image data addresses corresponding to the determination image data identification information for the same imaging target. Then, the similarity calculation unit 109 reads the captured image data address corresponding to the captured image data identification information from the captured image data table in the image data storage unit 112. Accordingly, the similarity calculation unit 109 reads the captured image data corresponding to the captured image data address and the reference image data corresponding to the reference image data address from the image data storage unit 112.

Figure 12:
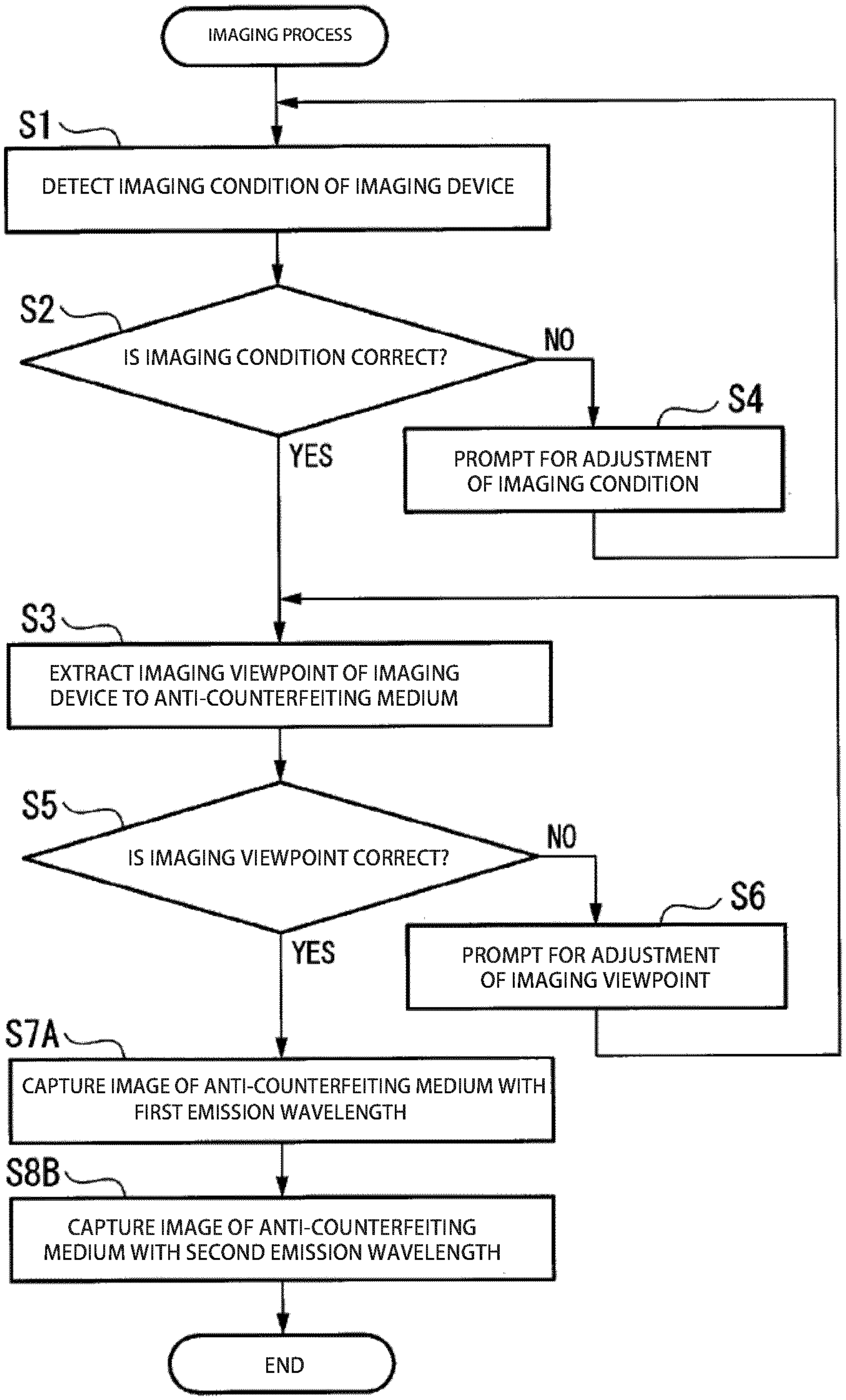
FIG. 12 is a flowchart of an example of operations for an authenticity determination process on an authenticity determination target with an anti-counterfeiting medium in an identification device according to a second embodiment.

FIG. 12 is a flowchart illustrating an example of operations for obtaining captured image data for use in an authenticity determination process on an authenticity determination target with an anti-counterfeiting medium in an identification device according to a second embodiment. In the process of obtaining captured image data described below, first captured image data and second captured image data are obtained corresponding to the number of kinds of emission wavelength spectrums in a preset imaging viewpoint, two kinds of emission wavelength spectrums in this embodiment. Referring to the flowchart in FIG. 12, steps S1 to S6 are identical to those in the first embodiment in FIG. 10.

Step S7A:

The imaging control unit 102 outputs a control signal indicative of a first imaging timing to the imaging unit 101, the exposure control unit 103, and the light characteristics control unit 105.

Accordingly, the exposure control unit 103 controls exposure in the imaging unit 101. The light characteristics control unit 105 outputs to the illumination unit 104 a control signal that cause the illumination unit 104 to emit light having the first emission wavelength spectrum corresponding to the first imaging timing. The illumination unit 104 irradiates light having the wavelength spectrum corresponding to the first emission wavelength spectrum supplied from the light characteristics control unit 105.

Then, the imaging unit 101 performs an imaging process on the imaging target to generate first captured image data including an image of the anti-counterfeiting medium, and outputs the first captured image data to the imaging control unit 102.

The imaging control unit 102 writes the first captured image data supplied from the imaging unit 101 into the image data storage unit 112, adds captured image data identification information to the first captured image data table, and writes and stores the captured image data address and the first emission wavelength spectrum in the captured image data table in the image data storage unit 112.

The observation angle estimation unit 106 writes and stores the imaging coordinate value and the imaging angle in the captured image data table in the image data storage unit 112.

Step S8A:

After a lapse of a predetermined period of time since the output of the first timing, the imaging control unit 102 outputs a control signal indicative of a second imaging timing to the imaging unit 101, the exposure control unit 103, and the light characteristics control unit 105.

Accordingly, the exposure control unit 103 controls exposure in the imaging unit 101. The light characteristics control unit 105 outputs to the illumination unit 104 a control signal that causes the illumination unit 104 to emit light having the second emission wavelength spectrum corresponding to the second imaging timing. The illumination unit 104 irradiates light having the wavelength spectrum corresponding to the second emission wavelength spectrum supplied from the light characteristics control unit 105.

Then, the imaging unit 101 performs an imaging process on the imaging target to generate second captured image data including an image of the anti-counterfeiting medium, and outputs the second captured image data to the imaging control unit 102.

The imaging control unit 102 writes the second captured image data supplied from the imaging unit 101 into the image data storage unit 112, and adds captured image data identification information to the second captured image data table, and writes and stores the captured image data address and the second emission wavelength spectrum in the captured image data table in the image data storage unit 112.

The observation angle estimation unit 106 writes and stores the imaging coordinate value and the imaging angle in the captured image data table in the image data storage unit 112.

Application Example 5

To attach the anti-counterfeiting medium 400 to the surface 300A of the credit card 300, the anti-counterfeiting medium 400 is formed such that a pattern with a Lambertian characteristic is formed as a base, and the fluorescent pigment YS-A (a fluorescent pigment produced by Nemoto & Co., Ltd., which will be hereinafter called fluorescent material C) is laid on the base pattern.

In the foregoing configuration, when the anti-counterfeiting medium 400 is imaged from a predetermined imaging viewpoint by irradiating the anti-counterfeiting medium 400 with light having the first emission wavelength spectrum as monochromatic light with a wavelength of 365 nm (ultraviolet light) from the illumination unit 104, the pattern of the fluorescent material C emits red visible light, which makes it possible to obtain the first captured image data with the red light pattern in the wavelength spectrum of the radiation light. On the other hand, when the anti-counterfeiting medium 400 is irradiated with illumination light having the second emission wavelength spectrum as monochromatic light with a wavelength of 550 nm (visible light) from the illumination unit 104, the pattern of the fluorescent material C does not emit light and thus the second captured image with the Lambertian pattern only from the radiation light is obtained.

Therefore, in the foregoing configuration, when the patterns of light (the pattern of the fluorescent material C and the emission light of Lambertian) in the first captured image data obtained by radiating light in the first emission wavelength spectrum (monochromatic light of 365 nm) from a predetermined imaging viewpoint and the preset pattern of light in the first reference image data coincide with each other in pattern shape and color and the pattern of light (the Lambertian pattern) in the second captured image data obtained by radiating light in the second emission wavelength spectrum (monochromatic light of 550 nm) from a predetermined imaging viewpoint and the preset pattern of light in the second reference image data coincide with each other in pattern shape and color, the anti-counterfeiting medium 400 is determined as real.

On the other hand, in the case of an anti-counterfeiting medium counterfeited by copying in color only the Lambertian base pattern, no pattern of fluorescent substance is formed on the Lambertian base pattern. Thus, even when the anti-counterfeiting medium is irradiated with monochromatic light as ultraviolet light having the first emission wavelength spectrum of 365 nm (for example, using an ultraviolet LED or the like), the first captured image data only with the Lambertian base pattern is obtained and the anti-counterfeiting medium is determined as false.

The fluorescent material is not limited to the fluorescent material C but may be any other fluorescent material with the foregoing characteristics.

FIGS. 13A to 13D illustrate the concept of an authenticity determination in the case of using the configuration of an anti-counterfeiting medium in the application example 5.

Figure 13A:
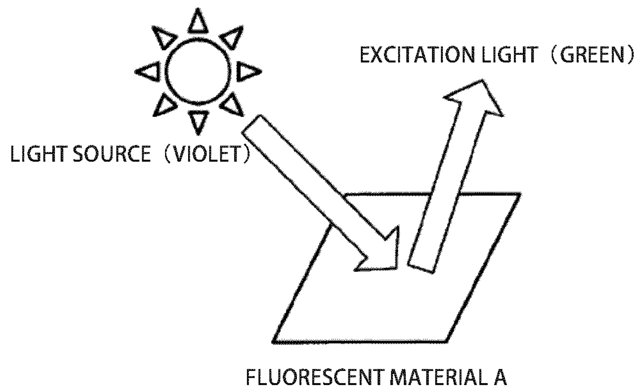
FIG. 13A illustrates the concept of an authenticity determination in the case of using a configuration of an anti-counterfeiting medium in Application Example 5.
Figure 13B:
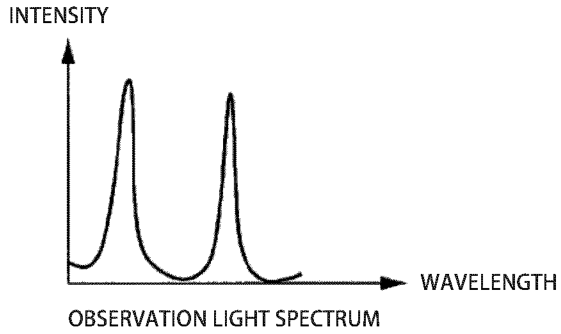
FIG. 13B illustrates the concept of an authenticity determination in the case of using the configuration of the anti-counterfeiting medium in Application Example 5.

FIG. 13A illustrates the case where the pattern of the fluorescent material C is irradiated with ultraviolet light having the first emission wavelength spectrum from the light source (the illumination unit 104). In this case, the fluorescent material emits a red pattern of visible light in response to the emitted light. Accordingly, as illustrated in the graph of FIG. 13B, as observed light (light patterns) in the first captured image data corresponding to the first emission wavelength spectrum, light patterns in two wavelength spectrums, that is, the pattern of light reflected by the Lambertian pattern from the radiation light having the first emission wavelength spectrum and the pattern of red visible light emitted from the fluorescent material C in the first emission wavelength spectrum are observed. In FIG. 13B, the vertical axis indicates intensity and the lateral axis indicates the wavelength spectrum of radiated light.

Figure 13C:
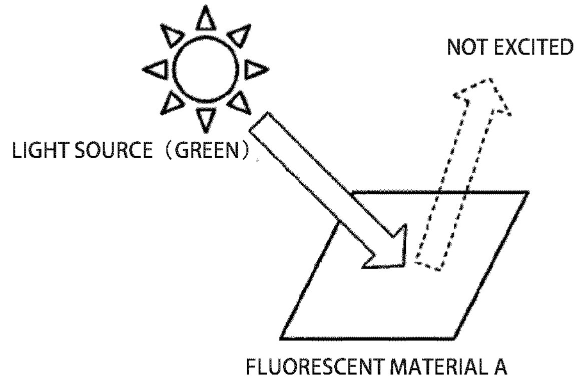
FIG. 13C illustrates the concept of an authenticity determination in the case of using the configuration of the anti-counterfeiting medium in Application Example 5.
Figure 13D:
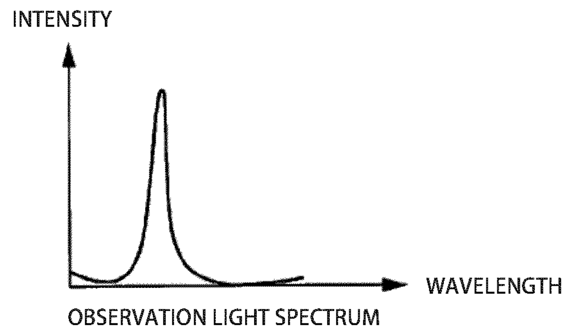
FIG. 13D illustrates the concept of an authenticity determination in the case of using the configuration of the anti-counterfeiting medium in Application Example 5.

FIG. 13C illustrates the case where the pattern of the fluorescent material C is irradiated with visible light (green monochrome light of 550 nm) in the second emission wavelength spectrum from the light source (the illumination unit 104). In this case, the fluorescent material does not emit a red pattern of visible light in response to the radiation light. Accordingly, as illustrated in FIG. 13D, as observed light (light pattern) in the second captured image data corresponding to the second emission wavelength spectrum, a light pattern in one wavelength spectrum in which the radiation light having the second emission wavelength spectrum is reflected by the Lambertian pattern is observed. In FIG. 13D, the vertical axis indicates intensity and the lateral axis indicates the wavelength of radiation light.

Application Example 6

A pattern of the anti-counterfeiting medium 400 is formed on the surface 300A of the credit card 300 by using a reflective material with a special spectral reflection characteristic (reflective material D described later), for example, holmium oxide (Ho2O3) as a lanthanide rare earth. The reflective material D has a characteristic of absorbing light with wavelengths of 450 nm, 540 nm, and 650 nm.

Figure 14:
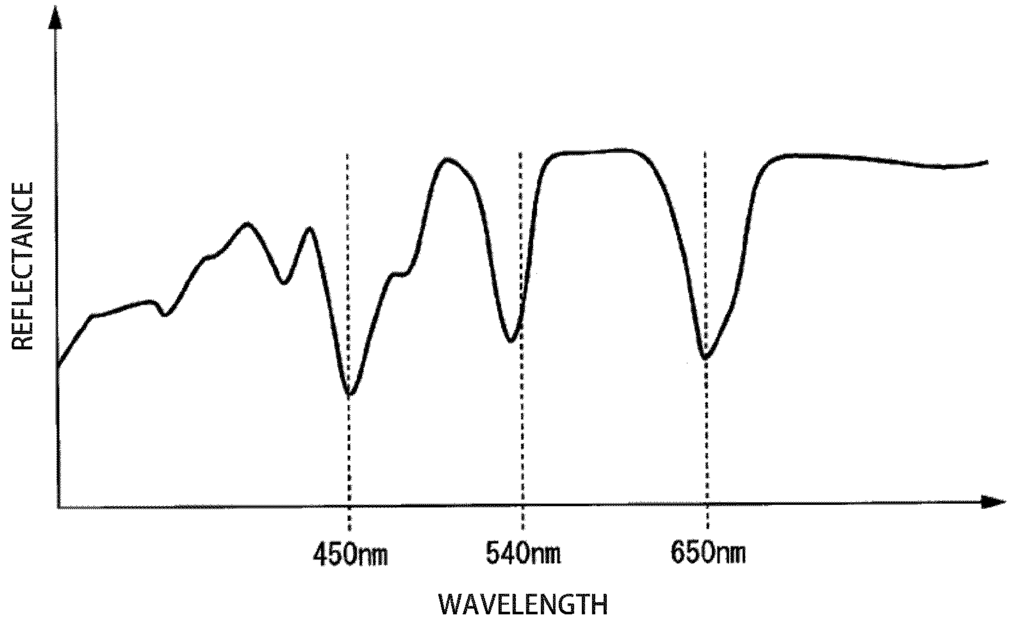
FIG. 14 illustrates the relationship between the wavelength and reflectance of light of holmium oxide.

FIG. 14 illustrates the relationship between the wavelength and reflectance of light of holmium oxide. In FIG. 14, the vertical axis indicates reflectance and the lateral axis indicates the wavelength of radiated light. As can be seen from FIG. 14, the reflective material D is extremely lower in reflectance at the wavelengths of 450 nm, 540 nm, and 650 nm than at other wavelengths. That is, the reflective material absorbs the light with the wavelengths of 450 nm, 540 nm, and 650 nm.

In this case, when being irradiated by a light source (sun light or halogen lamp) with an even radiance value in the entire visible wavelength range, the reflective material is observed as pale yellow. On the other hand, when being irradiated by a three-wavelength fluorescent lamp (a light source with radiance value peaks with wavelengths of 450 nm, 540 nm, and 610 nm illustrated in FIG. 15 described later), the reflective material D is observed as pink.

Figure 15:
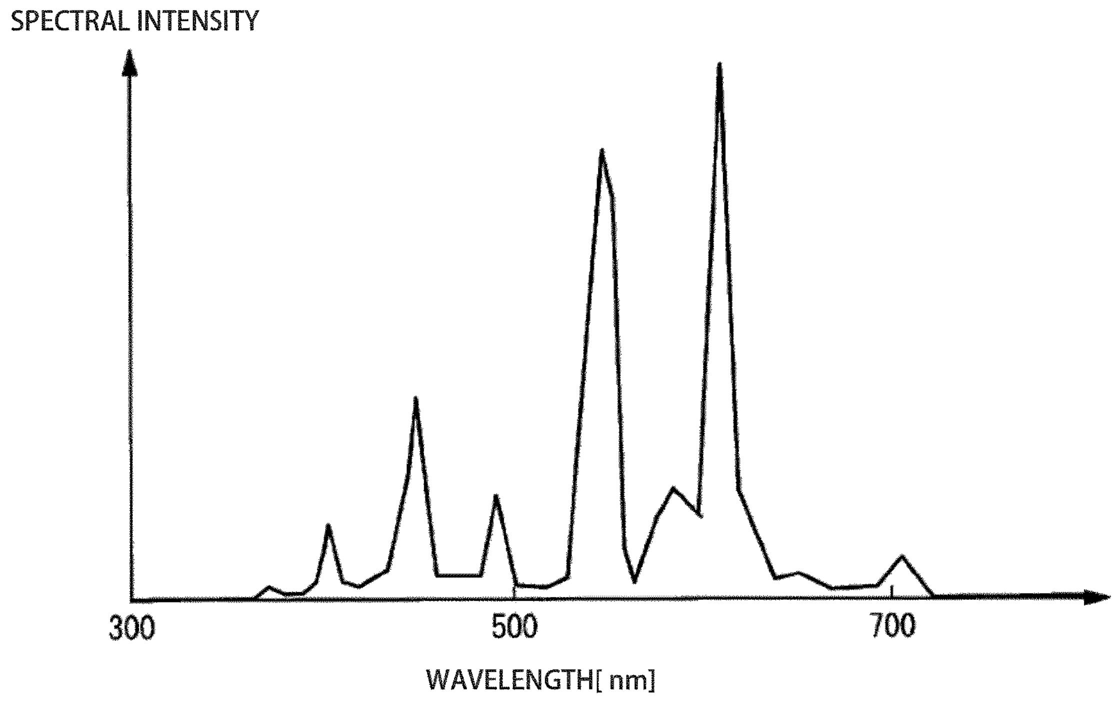
FIG. 15 illustrates the relationship between the wavelength and spectral intensity (luminance value) of a three-wavelength fluorescent lamp.

FIG. 15 illustrates the relationship between the wavelength and spectral intensity (luminance value) of a three-wavelength fluorescent lamp. In FIG. 15, the vertical axis indicates spectral intensity (luminance value) and the lateral axis indicates wavelength. In this embodiment, for example, a three-wavelength fluorescent lamp with luminance value peaks with the wavelengths of 450 nm, 540 nm, and 610 nm illustrated in FIG. 15 is used as a source for light in the foregoing spectrums.

When the anti-counterfeiting medium is irradiated with light having the first emission wavelength spectrum with an even radiance value in the entire visible wavelength range, the first captured image data is obtained in which the color of a pattern of light emitted by the reflective material D is observed as pale yellow. On the other hand, when the anti-counterfeiting medium is irradiated with light having the second emission wavelength spectrum from the three-wavelength fluorescent lamp, the second captured image data is obtained in which the color of a pattern of light emitted by the reflective material D is observed in pink.

Therefore, in the foregoing configuration, when the pattern of light (the pattern of pale yellow light emitted by the reflective material D) in the first captured image data obtained by radiating light having the first emission wavelength spectrum (with an even radiance value in the entire visible wavelength range) from a predetermined imaging viewpoint and the preset pattern of light in the first reference image data coincide with each other in pattern shape and color and the pattern of light (the pattern of pink light emitted by the reflective material D) in the second captured image data captured by radiation light having the second emission wavelength spectrum (three-wavelength fluorescent lamp) from a predetermined imaging viewpoint and the preset pattern in the second reference image data coincide with each other in pattern shape and color, the anti-counterfeiting medium 400 is determined as real.

On the other hand, an anti-counterfeiting medium counterfeited by copying the pattern of the reflective material D in the anti-counterfeiting medium in pigments (inks) in a copy machine cannot reproduce the foregoing spectral reflection characteristics. Accordingly, in both the case where the radiation light with an even radiance value in the entire visible wavelength range is used as radiation light having the first emission wavelength spectrum and the case where the radiation light of a three-wavelength fluorescent lamp is used as radiation light having the second emission wavelength spectrum, different colors are captured and thus the anti-counterfeiting medium 400 is determined as false.

According to this embodiment, the first reference image data and the second reference image data different in pattern are set respectively for the first captured image data obtained by the radiation light having the first emission wavelength spectrum and the second captured image data obtained by the radiation light having the second emission wavelength spectrum. This makes it possible to determine as false an anti-counterfeiting medium counterfeited corresponding to the first emission wavelength spectrum, the second emission wavelength spectrum, or environmental light from a normal fluorescent lamp by printing or the like such that an image of a light pattern similar to the light pattern of a real anti-counterfeiting medium is captured at a predetermined angle. As a method for adjusting the wavelength spectrum of illumination light, for example, a plurality of kinds of illuminators emitting light having different wavelength spectrums are prepared so that the illuminator to irradiate an anti-counterfeiting medium with light is selected in each case corresponding to the necessary wavelength spectrum. Alternatively, an illuminator and a prism, and a slit as necessary, may be used to split light to be radiated such that the wavelength spectrum of light for irradiating an anti-counterfeiting medium can be selected. Still alternatively, these methods may be used in combination to generate a complex wavelength spectrum with a plurality of peaks.

Third Embodiment

A third embodiment of the present invention will be described with reference to the drawings.

The third embodiment is similar in configuration to the first embodiment illustrated in FIG. 1 as with the second embodiment. Different operations of the second embodiment from those of the first embodiment will be described. In the third embodiment, to obtain captured image data, the polarization state of radiation light is changed, not radiance values, as a plurality of characteristics of radiation light to be changed. As linear polarized light, for example, first emission polarized light is perpendicular polarized light and second emission polarized light is horizontal polarized light. As circular (or elliptic) polarized light, first emission polarized light is left-handed circular (or elliptic) polarized light and the second emission polarized light is right-handed circular (or elliptic) polarized light.

During image capture with a supply of a control signal indicating an imaging timing, with each input of a control signal, the light characteristics control unit 105 outputs to the illumination unit 104 a control signal for radiating light different in light characteristics. In this embodiment, the characteristics of radiation light will be described as the polarized state of radiation light.

The imaging unit 101 has a polarization filter such as a liquid crystal filter, for example, to limit the polarization state of transmission light to be supplied into a CCD or the like.

According to this configuration, the polarization filter is attached to the imaging unit 101 so that, when the polarization state of the radiated light is changed by reflection on an anti-counterfeiting medium, the polarization filter transmits the reflection light in the changed polarized state. Accordingly, using a reflective material varying in the polarization state after reflection depending on the polarization state of the illumination light makes it possible to generate a plurality of reference image data according to the different polarized light, and comparing the reference image data with the captured image data obtained from a predetermined imaging viewpoint in the different polarization states makes it possible to perform an authenticity determination using polarization as the light characteristic.

According to this embodiment, the first reference image data and the second reference image data different in pattern are set respectively for the first captured image data obtained by the radiation light of first emission polarized light and the second captured image data obtained by the radiation light of the second emission polarized light. This makes it possible to determine as false an anti-counterfeiting medium counterfeited by printing or the like corresponding to the first emission polarized light or the second emission polarized light so that an image of a light pattern similar to the light pattern of a real anti-counterfeiting medium is captured at a predetermined angle.

The authenticity determination process may be performed on an anti-counterfeiting medium with the use of captured image data by recording a program for implementing the functions of the authenticity determination device 1 illustrated in FIG. 1 according to the present invention on a computer-readable recording medium, reading the program from the recording medium into a computer system, and then executing the program. The "computer system" here includes an operating system (OS) and hardware such as peripheral devices.

The "computer system" includes a World Wide Web (WWW) system including a web site providing environment (or web site displaying environment). The "computer-readable recording medium" means a mobile medium such as a flexible disc, a magneto-optical disc, a read only memory (ROM), or a compact disc-read only memory (CD-ROM), or a storage device such as a hard disc built into the computer system. Further, the "computer-readable recording medium" includes a medium holding the program for a certain time such as a volatile memory (random access memory (RAM)) in the computer system that acts as a server or a client in the case where the program is transmitted via a network such as the internet or a communication line such as a phone line.

The foregoing program may be transmitted from the computer system storing the program in the storage device or the like to another computer system via a transmission medium or a transmission wave in the transmission medium. The "transmission medium" transmitting the program here means a medium having a function of transmitting information like a network (communication network) such as the internet or a communication line (communication wire) such as a phone line. The foregoing program may be designed to implement some of the functions described above. Further, the program may be a program implementing the foregoing functions by combination with a program already recorded in the computer system, that is, a differential file (differential program).

REFERENCE SIGNS LIST

1 . . . Authenticity determination device (identification device); 101 . . . Imaging unit; 102 . . . Imaging control unit; 103 . . . Exposure control unit; 104 . . . Illumination unit; 105 . . . Light characteristics control unit; 106 . . . Observation angle estimation unit; 107 . . . Usable image selection unit; 108 . . . Reference image generation unit; 109 . . . Similarity calculation unit; 110 . . . Authenticity determination unit; 111 . . . Display unit; 112 . . . Image data storage unit; 200 . . . Light source; 300 . . . Credit card; 302 . . . Relief structure formation layer; 310 . . . First concave-convex structure part; 320 . . . Second concave-convex structure part; 321 . . . Convex portion; 330 . . . Directive scattering structure; 331 . . . Light scattering structure.

What is claimed is:

1. An identification device that determines authenticity of an article comprising an anti-counterfeiting medium based on changes in a pattern of an observed light from the anti-counterfeiting medium between a plurality of radiance values of a radiance of illumination light that irradiates the anti-counterfeiting medium, comprising:

a similarity calculation unit that determines a degree of similarity between captured image data for the pattern of the observed light from the anti-counterfeiting medium for each radiance value of the plurality of radiance values and reference image data; and an authenticity determination unit that determines whether the anti-counterfeiting medium is fake if for at least one radiance value of the plurality of radiance values, the determined degree of similarity is equal to or more than a similarity threshold.

2. The identification device of claim 1, further comprising:

a light source that irradiates the anti-counterfeiting medium with the illumination light to generate a light pattern as a standard for authenticity determination during image capture;

a light characteristics control unit that changes the radiance of the illumination light with which the light source irradiates the anti-counterfeiting medium; and an imaging control unit that generates the captured image data of the light pattern generated by the anti-counterfeiting medium for each radiance value of the plurality of radiance values.

3. The identification device of claim 1, wherein, the authenticity determination unit determines that the anti-counterfeiting medium is genuine if for each radiance value of the plurality of radiance values, the determined degree of similarity is equal less than a similarity threshold.

4. The identification device of claim 1, further comprising a reference image generation unit that generates the reference image data for comparison with the captured image data of the anti-counterfeiting medium, the reference image data corresponding to a predetermined imaging viewpoint and the radiance.

5. The identification device of claim 1, wherein the illumination light is a white light and the anti-counterfeiting medium comprises a diffraction grating.

6. An identification method for determining authenticity of an article comprising an anti-counterfeiting medium based on changes in a pattern of an observed light from the anti-counterfeiting medium between a plurality of radiance values of a radiance of illumination light that irradiates the anti-counterfeiting medium, comprising:

determining, by a similarity calculation unit, a degree of similarity between captured image data for the pattern of the observed light from the anti-counterfeiting medium for each radiance value of the plurality of radiance values and reference image data; and determining, by an authenticity determination unit, whether the anti-counterfeiting medium is fake if for at least one radiance value of the plurality of radiance values, the determined degree of similarity is equal to or more than a similarity threshold.

7. The identification method of claim 6, wherein the illumination light is a white light and the anti-counterfeiting medium comprises a diffraction grating.

8. A non-transitory computer-readable medium including an identification program for causing a computer to execute an identification process for determining authenticity of an article comprising an anti-counterfeiting medium based on changes in a pattern of an observed light from the anti-counterfeiting medium between a plurality of radiance values of a radiance of illumination light that irradiates the anti-counterfeiting medium, wherein the program causes the computer to execute the identification method including:

determining a degree of similarity between captured image data for the pattern of the observed light from the anti-counterfeiting medium for each radiance value of the plurality of radiance values and reference image data; and determining whether the anti-counterfeiting medium is fake if for at least one radiance value of the plurality of radiance values, the determined degree of similarity is equal to or more than a similarity threshold.

9. The non-transitory computer readable medium of claim 8, wherein the illumination light is a white light and the anti-counterfeiting medium comprises a diffraction grating.

* * * * *